United States Patent
Niesen et al.

(10) Patent No.: US 11,941,836 B2
(45) Date of Patent: Mar. 26, 2024

(54) OBJECTION DETECTION USING IMAGES AND MESSAGE INFORMATION

(71) Applicant: QUALCOMM Incorporated, San Diego, CA (US)

(72) Inventors: Urs Niesen, Berkeley Heights, NJ (US); Murali Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/547,366

(22) Filed: Dec. 10, 2021

(65) Prior Publication Data

US 2022/0405952 A1  Dec. 22, 2022

Related U.S. Application Data

(60) Provisional application No. 63/209,880, filed on Jun. 11, 2021.

(51) Int. Cl.
*G06T 7/70* (2017.01)
*G06T 3/40* (2006.01)
(Continued)

(52) U.S. Cl.
CPC .................. *G06T 7/70* (2017.01); *G06T 3/40* (2013.01); *G06T 7/277* (2017.01); *G06T 7/62* (2017.01); *G06V 10/22* (2022.01); *G06V 20/56* (2022.01); *G06T 2207/30252* (2013.01); *G06V 2201/08* (2022.01)

(58) Field of Classification Search
CPC .. G06T 7/70; G06T 7/62; G06T 7/277; G06V 10/22
See application file for complete search history.

(56) References Cited

U.S. PATENT DOCUMENTS

2016/0210525 A1* 7/2016 Yang .................... G06V 10/32
2017/0220876 A1  8/2017 Gao et al.
(Continued)

FOREIGN PATENT DOCUMENTS

KR     20210041213    *  4/2021  ............ G08G 1/075
KR     20210041213 A     4/2021

OTHER PUBLICATIONS

International Search Report and Written Opinion—PCT/US2022/025136—ISA/EPO—dated Sep. 9, 2022.
(Continued)

*Primary Examiner* — Myron Wyche
(74) *Attorney, Agent, or Firm* — QUALCOMM Incorporated

(57) ABSTRACT

Disclosed are techniques for performing object detection and tracking. In some implementations, a process for performing object detection and tracking is provided. The process can include steps for obtaining, at a tracking object, an image comprising a target object, obtaining, at the tracking object, a first set of messages associated with the target object, determining a bounding box for the target object in the image based on the first set of messages associated with the target object, and extracting a sub-image from the image. In some approaches, the process can further include steps for detecting, using an object detection model, a location of the target object within the sub-image. Systems and machine-readable media are also provided.

26 Claims, 14 Drawing Sheets

(51) Int. Cl.
    *G06T 7/277*      (2017.01)
    *G06T 7/62*      (2017.01)
    *G06V 10/22*      (2022.01)
    *G06V 20/56*      (2022.01)

(56) References Cited

U.S. PATENT DOCUMENTS

2018/0276841 A1    9/2018  Krishnaswamy et al.
2022/0044439 A1*  2/2022  Hou ......................... G06T 7/75

OTHER PUBLICATIONS

Partial International Search Report—PCT/US2022/025136—ISA/EPO—dated Jul. 19, 2022.

* cited by examiner

Image with GT Boxes 8 x 8 Feature Map 4 x 4 Feature Map loc : $\Delta(cx, cy, w, h)$
conf : $(c_1, c_2, \ldots, c_p)$

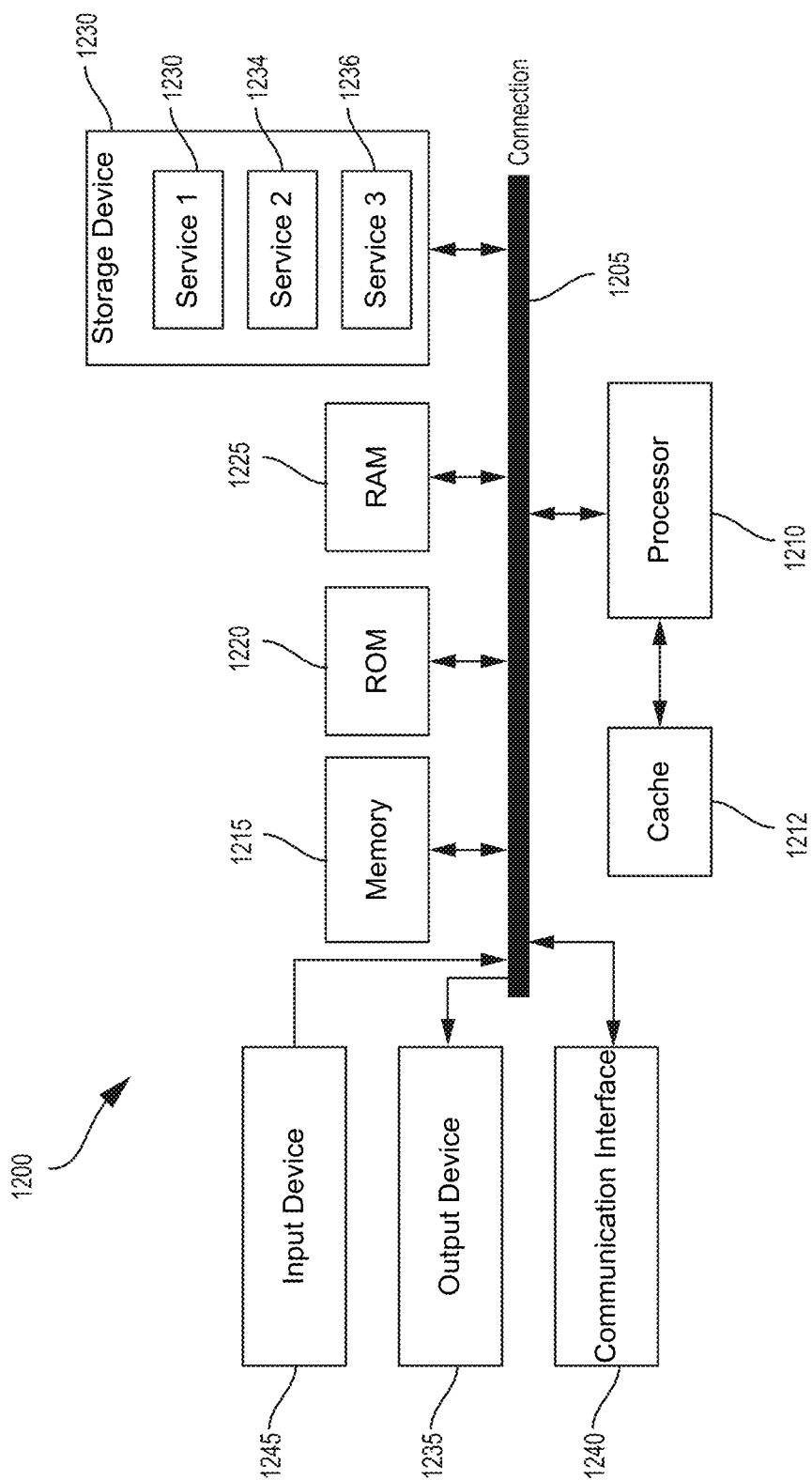

OBJECTION DETECTION USING IMAGES AND MESSAGE INFORMATION

CROSS-REFERENCE TO RELATED APPLICATIONS

The present application claims the benefit of U.S. Provisional Application No. 63/209,880, filed Jun. 11, 2021, entitled "OBJECTION DETECTION USING IMAGES AND MESSAGE INFORMATION," which is hereby incorporated by reference in its entirety and for all purposes.

FIELD OF THE DISCLOSURE

Aspects of the disclosure relate generally to object detection and tracking. In some implementations, examples are described for performing object detection and tracking based on images and information included in one or more messages.

BACKGROUND OF THE DISCLOSURE

Object detection and tracking can be used to identify an object (e.g., from a digital image or a video frame of a video clip) and track the object over time. Object detection and tracking can be used in different fields, including transportation, video analytics, security systems, robotics, aviation, among many others. In some fields, a tracking object can determine positions of other objects (e.g., target objects) in an environment so that the tracking object can accurately navigate through the environment. In order to make accurate motion and trajectory planning decisions, the tracking object may also have the ability to estimate various target object characteristics, such as pose (e.g., including position and orientation) and size.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing object detection and tracking. According to at least one example, an apparatus is provided for performing object detection and tracking. The apparatus can include at least one memory, and at least one processor (e.g., configured in circuitry) coupled to the at least one memory. The at least one processor is configured to: obtain, at a tracking object, an image comprising a target object; obtain, at the tracking object, a first set of messages associated with the target object; determine a bounding box for the target object in the image based on the first set of messages associated with the target object; extract a sub-image from the image, wherein the sub-image comprises an area of the image within the bounding box; and detect, using an object detection model, a location of the target object within the sub-image.

In another example, a method for performing object detection and tracking is provided. The method includes: obtaining, at a tracking object, an image comprising a target object; obtaining, at the tracking object, a first set of messages associated with the target object; determining a bounding box for the target object in the image based on the first set of messages associated with the target object; extracting a sub-image from the image, wherein the sub-image comprises an area of the image within the bounding box; and detecting, using an object detection model, a location of the target object within the sub-image.

In another example, a non-transitory computer-readable storage medium is provided. The non-transitory computer-readable storage medium includes at least one instruction for causing a computer or processor to: obtain, at a tracking object, an image comprising a target object; obtain, at the tracking object, a first set of messages associated with the target object; determine a bounding box for the target object in the image based on the first set of messages associated with the target object; extract a sub-image from the image, wherein the sub-image comprises an area of the image within the bounding box; and detect, using an object detection model, a location of the target object within the sub-image.

In another example, an apparatus for performing object detection and tracking is provided. The apparatus includes: means for obtaining, at a tracking object, an image comprising a target object; means for obtaining, at the tracking object, a first set of messages associated with the target object; means for determining a bounding box for the target object in the image based on the first set of messages associated with the target object; means for extracting a sub-image from the image, wherein the sub-image comprises an area of the image within the bounding box; and means for detecting, using an object detection model, a location of the target object within the sub-image.

In some aspects, the apparatus is or is part of a vehicle (e.g., one or more components or chips in a computer system of a vehicle), a mobile device (e.g., a mobile telephone or so-called "smart phone" or other mobile device), a wearable device, an extended reality device or system (e.g., a virtual reality (VR) device, an augmented reality (AR) device, or a mixed reality (MR) device), a personal computer, a laptop computer, a server computer, a robotics device or system, an aviation system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a tracking state, a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 12 is a block diagram of an exemplary computing device that may be used to implement some aspects of the technology described herein, in accordance with some examples.

DETAILED DESCRIPTION

Figure 1:
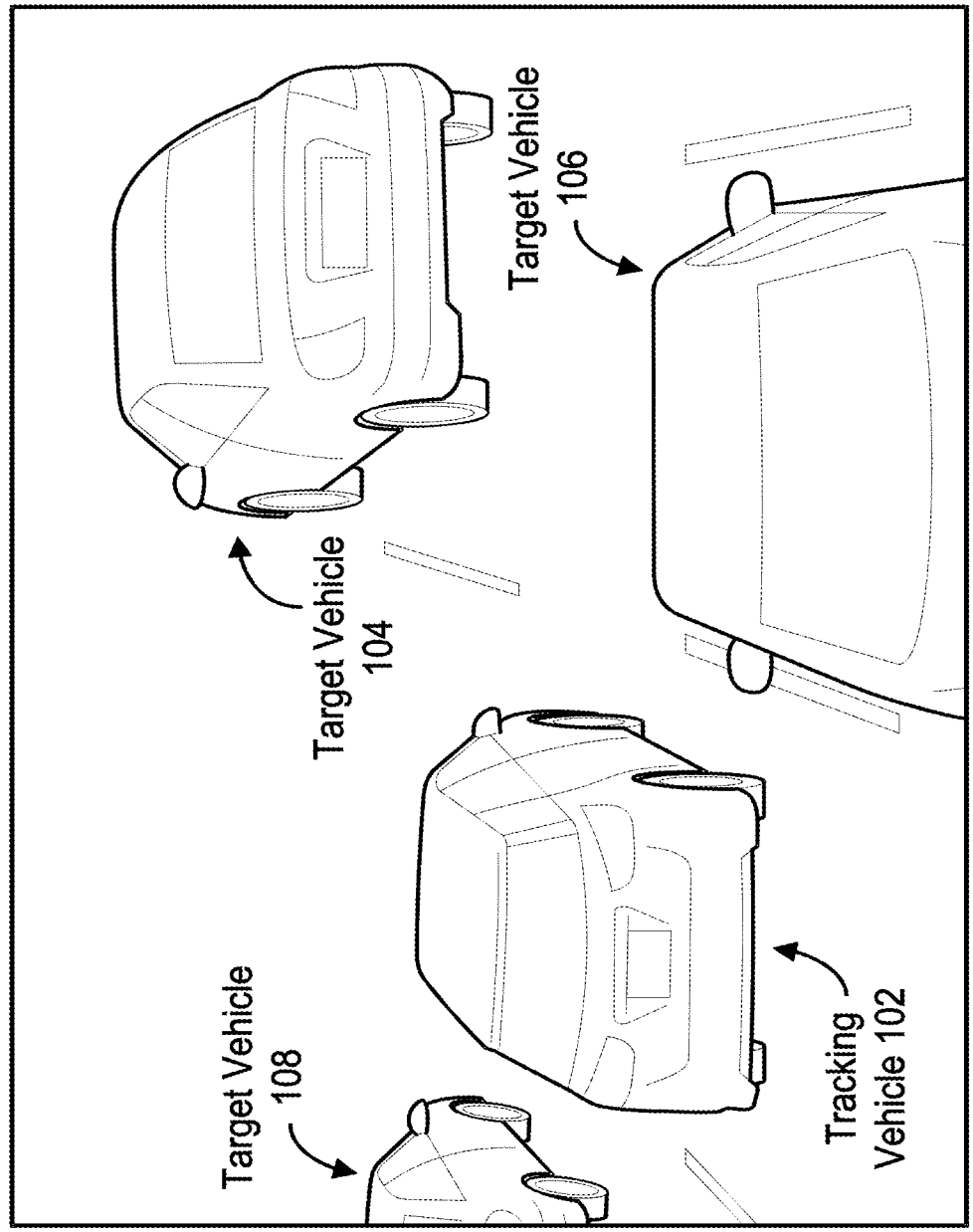
FIG. 1 is an image illustrating multiple vehicles driving on a road, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes can be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Object detection can be used to detect or identify an object in an image or frame. Object tracking can be performed to track the detected object over time. For example, an image of an object can be obtained, and object detection can be performed on the image to detect one or more objects in the image. In some cases, an object detector used to detect the object can classify the detected object into a class or category of object. The object detector can generate a bounding region to identify a location of the object in the image. In some cases, the bounding region can be displayed in the image in order to identify the object to a user viewing a display. Various types of systems can be used for object detection, including machine-learning based object detectors (e.g., using one or more deep neural networks).

Object detection and tracking can be used in driving systems, video analytics, security systems, robotics systems, aviation systems, extended reality (XR) systems (e.g., augmented reality (AR) systems, virtual reality (VR) systems, mixed reality (MR) systems, etc.), among other systems. In such systems, an object (referred to as a tracking object) tracking other objects (referred to as target objects) in an environment can determine positions and sizes of the other objects. Determining the positions and sizes of target objects in the environment allow the tracking object to accurately navigate the environment by making intelligent motion planning and trajectory planning decisions.

As noted above, machine-learning models (e.g., deep neural networks) can be used for performing object detection and localization in some cases. Machine-learning based object detection can be computationally intensive, can be difficult to implement in contexts where detection speed is a high-priority, among other difficulties. For example, machine-learning based object detection can be computationally intensive as they are typically run on the entire image and (either implicitly or explicitly) at various scales to capture target objects (e.g., target vehicles) at different distances from a tracking object (e.g., a tracking or ego vehicle). Examples of the numerous scales that may be considered by a neural-network based object detector are shown in and described below with respect to FIG. 9A-FIG. 9C and FIG. 10A-FIG. 10C. In addition, to be able to detect objects at various scales, machine-learning based object detectors are trained with a large amount of annotated data (which can be computationally and time-intensive). Moreover, machine-learning based object detection may only work if the target object (e.g., a target vehicle) is visible in an image and is not occluded by other objects (e.g., such as a large truck occluding a vehicle) or obstacles.

In some cases, objects can be detected based on received messages. For instance, a tracking vehicle may determine a position of a target vehicle relative to the tracking vehicle by determining a bounding box for the target vehicle using messages received over a wireless channel. For example, the messages can be cellular vehicle-to-everything (V2X or C-V2X), Dedicated Short-Range Communications (DSRC)

messages, and/or other types of wireless messages. Such an approach has the advantage of being computationally efficient and of being unaffected by occlusions. However, the message-based approach has the disadvantage of being inaccurate. For instance, global position estimates of both the tracking and target objects (e.g., tracking and target vehicles) can have a particular uncertainty or errors, such as 1 meter (m), resulting in relative position estimate errors of up to 2 m (1 m for the tracking object and 1 m for the target object). In such an example, a computed bounding box on the image can be off target by up to half, which will be noticeable and potentially misleading to an operator of the tracking object (e.g., a driver of a vehicle).

Systems, apparatuses, processes (methods), and computer-readable media (collectively referred to as "systems and techniques") are described herein that provide solutions to improve object detection and tracking. The systems and techniques described herein can be applied to any scenario, such as scenarios where fast detections are necessary, where compute resources are limited, among others. In some aspects, object detection (e.g., machine-learning (ML) based object detection or other type of object detection) is performed for select areas of images, for example, an area of an image that is known (or is highly likely) to contain a target object. By constraining detection operations to these select image areas, detection speed and accuracy can be improved, while also reducing computational overhead.

In some approaches, a detection and tracking system of a tracking object (e.g., a tracking vehicle) can receive or obtain images containing a target object (e.g., a target vehicle). The detection and tracking system can use the images to perform an object detection and tracking process. In some examples, the detection and tracking system can receive one or more messages that are wirelessly received by the tracking vehicle (or tracking object) from the target vehicle (or target object). The detection and tracking system can determine a bounding box for the target object based on information included in a set of one or more messages (where the set of messages can include one message or multiple messages). In some implementations, the messages can be (or may include) vehicle-to-everything (V2X), DSRC, and/or other types of wireless messages that include information indicating motion parameters and/or pose parameters of the target object. By way of example, V2X and/or DSRC messages received by a tracking vehicle from a target vehicle can include information indicating a velocity, size, and/or pose (e.g., three-dimensional (3D) position and 3D orientation) of the target vehicle. In some implementations, the received messages can include various types of positioning information, such as latitude, longitude, and/or position uncertainty estimates. Although several of the examples illustrated herein are discussed in the context of received V2X and/or DSRC messages, it is understood that positioning and/or uncertainty information may be received (or derived) using other means. For example, latitude, longitude and/or uncertainty information may be determined using virtually any position or location determination technology, without departing from the scope of the disclosed technology.

In one illustrative example, the target vehicle can wirelessly transmit to the tracking vehicle a V2X and/or a DSRC message including the target vehicle's size, position, orientation, and velocity estimates expressed with respect to a global reference frame such as an earth-centered, earth-fixed (ECEF) reference frame. The position, orientation, and velocity estimates can be determined or obtained using a Global Positioning System (GPS), a Global Navigation Satellite System (GNSS), and/or other position-based estimation based on information received using a GPS receiver or transceiver, a GNSS receiver or transceiver, and/or other receiver or transceiver. The tracking vehicle can determine its own position and orientation estimate with respect to the same global reference frame. Using the position and orientations of the tracking object and the target object, the detection and tracking system of the tracking object can compute the relative position of the target vehicle with respect to the tracking vehicle's body reference frame.

In some examples, the detection and tracking system of the tracking object can take into consideration one or more factors (e.g., based on the information in the set of received messages) when determining the bounding box. The one or more factors can include a pose estimate (e.g., 3D orientation and/or position) associated with the target object, a size or size estimate associated with the target object, a pose estimate for the tracking object, and/or an uncertainty (or error) associated the pose estimates for the target and/or tracking objects. In some approaches, pose estimates for the tracking object and/or the target object can be associated with uncertainty measures that correspond with estimating the position and/or orientation of either (or both) the tracking and/or target objects. By way of example, position or location estimates can be based on geolocation measurements, such as those made using GPS, GNSS, and/or other position-based estimation. Such measurements can include known uncertainties and/or determinable measurement errors that can be accounted for when making bounding box determinations. As such, the detection and tracking system of the tracking object can determine a size of the bounding box determined for the target object to account for the aforementioned position estimate uncertainty measures. For instance, the initial bounding box size determined based on the size and/or pose information included in the received messages (e.g., the V2X, DSRC, and/or other type of messages) can be increased based on the uncertainty of the pose estimate. Determining or re-sizing the bounding box based on the estimate uncertainty can result in a high statistical confidence that an area of the image that is within the computed bounding box includes the target object.

In some aspects, the detection and tracking system can extract or crop the image area within the determined bounding box (e.g., after determining or increasing the bounding box size based on the estimate uncertainty) to produce or generate a sub-image. The detection and tracking system can use the extracted sub-image to identify a precise location of the target object (e.g., using an object detection model). In some aspects, the detection and tracking system can pre-process the sub-image (e.g., by scaling the sub-image) to a particular width and/or height. In some cases, the width and/or height to which the sub-image is scaled is commensurate with the input configuration of a detection model that can be used to perform object detection on the sub-image. By way of example, the detection and tracking system can scale the sub-image to a predetermined dimension (e.g., with a pre-determined width and/or a predetermined height) that corresponds with the input layer of an object detection model that is (or that includes) a machine-learning (ML) based classifier, such as a deep neural network. The object detection model of the detection and tracking system can then perform object detection on the scaled image in order to detect the position and/or location of the object in the image. In some cases, the object detection model can generate a final bounding box that indicates the location or position of the object in the image. In some examples, the object detection model can output or otherwise cause the bounding box to be displayed on a display (e.g., on a digital display of a vehicle, such as a digital mirror including a display).

In some cases, the detection and tracking system can track (e.g., using an object tracker) the location of the target object over time (e.g., in or more images or frames that are subsequent to the image or frame in which the object was detected). Although various object trackers can be used, depending on the desired implementation, in some examples, the object tracker may be (or may include) a Kalman filter, an extended Kalman filter, a particle filter, any combination thereof, and/or other object tracker. Object tracking can be performed across multiple successive images (or frames), for example, that are received by the tracking object, e.g., captured by an image-capture device, such as a camera, Light Detection and Ranging (LiDAR) sensor, and/or a radar sensor of the tracking object).

Object tracking can be used to update a display, such as a display device of the tracking object (e.g., a digital mirror), to indicate changes in location and/or pose of the target object (e.g., by displaying an updated bounding box relative to the object in one or more images following the image in which the object was detected). As discussed in further detail below, the detection and tracking system can perform object tracking over successive images using velocity and/or pose information that is received by the tracking object via one or more messages (e.g., V2X and/or DSRC messages) transmitted by the target object.

Examples are described herein using vehicles as illustrative examples of tracking objects and target objects. However, one of ordinary skill will appreciate the systems and related techniques described herein can be included in and performed by any other system or device for detecting and/or tracking any type of objects in one or more images. Examples of other systems that can perform or that can include components for performing the techniques described herein include robotics systems, extended reality (XR) systems (e.g., augmented reality (AR) systems, virtual reality (VR) systems, mixed reality (MR) systems, etc.), video analytics, security systems, aviation systems, among others systems. Examples of other types of objects that can be detected include people or pedestrians, infrastructure (e.g., roads, signs, etc.), among others. In one illustrative example, a tracking vehicle can perform one or more of the techniques described herein to detect a pedestrian or infrastructure object (e.g., a road sign) in one or more images.

In some examples, the systems and techniques can be used for one or more digital display mirrors on a vehicle (e.g., rear-view and side-view mirrors) that combine the images captured from one or more outward-facing cameras mounted on the vehicle to provide the driver of the vehicle an unobstructed view of the environment surrounding the vehicle. For example, the systems and techniques can digitally modify the image displayed on the mirror to superimpose additional information on the mirror. For instance, the systems and techniques can display information (e.g., one or more bounding boxes) highlighting or otherwise identifying one or more target vehicles, road objects, and/or other information surrounding the vehicle in a portion of the environment displayed by the digital display mirror. Such information can be useful for a driver when maneuvering the vehicle (e.g., during lane changes, merges, etc.).

Various aspects of the application will be described with respect to the figures. FIG. 1 is an image 100 illustrating an environment including numerous vehicles driving on a road. The vehicles include a tracking vehicle 102 (as an example of a tracking object), a target vehicle 104, a target vehicle 106, and a target vehicle 108 (e.g., as examples of tracking object). The tracking vehicle 102 can track the target vehicles 104, 106, and 108 in order to navigate the environment. For example, the tracking vehicle 102 can determine the position and size of the target vehicle 104 to determine when to slow down, speed up, change lanes, and/or perform some other function. While the vehicle 102 is referred to as a tracking vehicle 102 and the vehicles 104, 106, and 108 are referred to as target vehicles with respect to FIG. 1, the vehicles 104, 106, and 108 can also be referred to as tracking vehicles if and when they are tracking other vehicles, in which the other vehicles become target vehicles.

Figure 2:
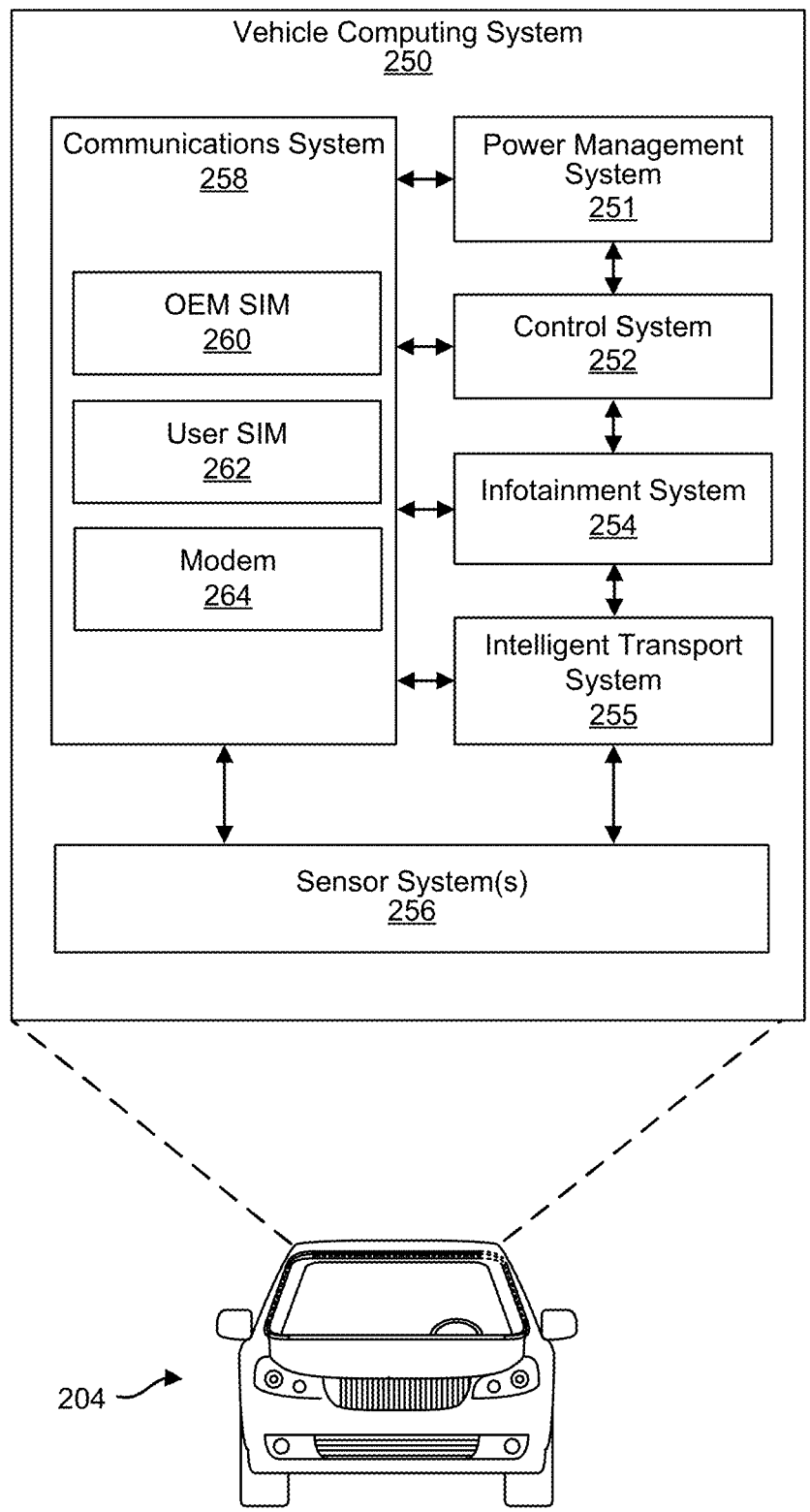
FIG. 2 is a block diagram illustrating an example of system for determining sizes, positions, and orientations of objects, in accordance with some examples.

FIG. 2 is a block diagram illustrating an example a vehicle computing system 250 of a vehicle 204. The vehicle 204 is an example of a UE that can communicate with a network (e.g., an eNB, a gNB, a positioning beacon, a location measurement unit, and/or other network entity) over a Uu interface and with other UEs using V2X communications over a PC5 interface (or another device-to-device direct interface). As shown, the vehicle computing system 250 can include at least a power management system 251, a control system 252, an infotainment system 254, an intelligent transport system (ITS) 255, one or more sensor systems 256, and a communications system 258. In some cases, the vehicle computing system 250 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 252 can be configured to control one or more operations of the vehicle 204, the power management system 251, the computing system 250, the infotainment system 254, the ITS 255, and/or one or more other systems of the vehicle 204 (e.g., a braking system, a steering system, a safety system other than the ITS 255, a cabin system, and/or other system). In some examples, the control system 252 can include one or more electronic control units (ECUs). An ECU can control one or more of the electrical systems or subsystems in a vehicle. Examples of specific ECUs that can be included as part of the control system 252 include an engine control module (ECM), a powertrain control module (PCM), a transmission control module (TCM), a brake control module (BCM), a central control module (CCM), a central timing module (CTM), among others. In some cases, the control system 252 can receive sensor signals from the one or more sensor systems 256 and can communicate with other systems of the vehicle computing system 250 to operate the vehicle 204.

The vehicle computing system 250 also includes a power management system 251. In some implementations, the power management system 251 can include a power management integrated circuit (PMIC), a standby battery, and/or other components. In some cases, other systems of the vehicle computing system 250 can include one or more PMICs, batteries, and/or other components. The power management system 251 can perform power management functions for the vehicle 204, such as managing a power supply for the computing system 250 and/or other parts of the vehicle. For example, the power management system 251 can provide a stable power supply in view of power fluctuations, such as based on starting an engine of the vehicle. In another example, the power management system 251 can perform thermal monitoring operations, such as by checking ambient and/or transistor junction temperatures. In another example, the power management system 251 can perform certain functions based on detecting a certain temperature level, such as causing a cooling system (e.g., one or more fans, an air conditioning system, etc.) to cool certain components of the vehicle computing system 250 (e.g., the control system 252, such as one or more ECUs), shutting down certain functionalities of the vehicle computing system 250 (e.g., limiting the infotainment system 254, such as by shutting off one or more displays, disconnecting from a wireless network, etc.), among other functions.

The vehicle computing system 250 further includes a communications system 258. The communications system 258 can include both software and hardware components for transmitting signals to and receiving signals from a network (e.g., a gNB or other network entity over a Uu interface) and/or from other UEs (e.g., to another vehicle or UE over a PC5 interface, WiFi interface, Bluetooth™ interface, and/or other wireless and/or wired interface). For example, the communications system 258 is configured to transmit and receive information wirelessly over any suitable wireless network (e.g., a 3G network, 4G network, 5G network, WiFi network, Bluetooth™ network, and/or other network). The communications system 258 includes various components or devices used to perform the wireless communication functionalities, including an original equipment manufacturer (OEM) subscriber identity module (referred to as a SIM or SIM card) 260, a user SIM 262, and a modem 264. While the vehicle computing system 250 is shown as having two SIMs and one modem, the computing system 250 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 260 can be used by the communications system 258 for establishing a wireless connection for vehicle-based operations, such as for conducting emergency-calling (eCall) functions, communicating with a communications system of the vehicle manufacturer (e.g., for software updates, etc.), among other operations. The OEM SIM 260 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 262 can be used by the communications system 258 for performing wireless network access functions in order to support a user data connection (e.g., for conducting phone calls, messaging, Infotainment related services, among others). In some cases, a user device of a user can connect with the vehicle computing system 250 over an interface (e.g., over PC5, Bluetooth™, WiFI™, a universal serial bus (USB) port, and/or other wireless or wired interface). Once connected, the user device can transfer wireless network access functionality from the user device to communications system 258 the vehicle, in which case the user device can cease performance of the wireless network access functionality (e.g., during the period in which the communications system 258 is performing the wireless access functionality). The communications system 258 can begin interacting with a base station to perform one or more wireless communication operations, such as facilitating a phone call, transmitting and/or receiving data (e.g., messaging, video, audio, etc.), among other operations. In such cases, other components of the vehicle computing system 250 can be used to output data received by the communications system 258. For example, the infotainment system 254 (described below) can display video received by the communications system 258 on one or more displays and/or can output audio received by the communications system 258 using one or more speakers.

A modem is a device that modulates one or more carrier wave signals to encode digital information for transmission, and demodulates signals to decode the transmitted information. The modem 264 (and/or one or more other modems of the communications system 258) can be used for communication of data for the OEM SIM 260 and/or the user SIM 262. In some examples, the modem 264 can include a 4G (or LTE) modem and another modem (not shown) of the communications system 258 can include a 5G (or NR) modem. In some examples, the communications system 258 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 264 (and/or one or more other modems of the communications system 258) can be used for performing V2X communications (e.g., with other vehicles for V2V communications, with other devices for D2D communications, with infrastructure systems for V2I communications, with pedestrian UEs for V2P communications, etc.). In some examples, the communications system 258 can include a V2X modem used for performing V2X communications (e.g., side-link communications over a PC5 interface), in which case the V2X modem can be separate from one or more modems used for wireless network access functions (e.g., for network communications over a network/Uu interface and/or side-link communications other than V2X communications).

In some implementations, V2X communications can include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, can use a short-range direct-communication mode that provides 360° non-line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles can also understand alerts or notifications from other V2X-enabled vehicles (based on V2V communications), from infrastructure systems (based on V2I communications), and from user devices (based on V2P communications). Infrastructure systems can include roads, stoplights, road signs, bridges, toll booths, and/or other infrastructure systems that can communicate with vehicles using V2I messaging. In some cases, V2X communication may utilize multiple operational modes. LTE sidelink (e.g., for D2D communications) introduced in Release 12 includes two modes of operation, referred to as mode 1 and mode 2. Both mode 1 and mode 2 were designed with an objective of prolonging the battery lifetime of mobile devices at the cost of increasing latency. Depending on the desired implementation, sidelink communications can be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol.

In some examples, sidelink communication can be performed using one or more Unlicensed National Information Infrastructure (U-NII) bands. For instance, sidelink communications can be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications. However, in some aspects, connect vehicles may benefit from highly reliable and low-latency V2X communications, and thus modes 1 and 2 may not be suitable for such applications.

Two additional communication modes (modes 3 and 4) were designed for V2V communications. In mode 3, the cellular network (e.g., an eNB, gNB, or other network entity) selects and manages the radio resources used by vehicles for performing direct V2X communications. In mode 4, vehicles autonomously select the radio resources for direct V2X communications. Mode 4 can operate without cellular coverage, and in some cases can be considered a baseline V2X mode based on the inability of safety applications to depend on the availability of cellular coverage. Mode 4 can include a distributed scheduling scheme for vehicles to select radio resources and can include support for distributed congestion control.

In some examples, the communications system 258 can be or can include a telematics control unit (TCU). In some implementations, the TCU can include a network access device (NAD) (also referred to in some cases as a network control unit or NCU). The NAD can include the modem 264, any other modem not shown in FIG. 2, the OEM SIM 260, the user SIM 262, and/or other components used for wireless communications. In some examples, the communications system 258 can include a Global Navigation Satellite System (GNSS). In some cases, the GNSS can be part of the one or more sensor systems 256, as described below. The GNSS can provide the ability for the vehicle computing system 250 to perform one or more location services, navigation services, and/or other services that can utilize GNSS functionality.

In some cases, the communications system 258 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 204 to communicate with a network and/or other UEs.

The vehicle computing system 250 can also include an infotainment system 254 that can control content and one or more output devices of the vehicle 204 that can be used to output the content. The infotainment system 254 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 204), and/or other output device.

In some examples, the computing system 250 can include the intelligent transport system (ITS) 255. In some examples, the ITS 255 can be used for implementing V2X communications. For example, an ITS stack of the ITS 255 can generate V2X messages based on information from an application layer of the ITS. In some cases, the application layer can determine whether certain conditions have been met for generating messages for use by the ITS 255 and/or for generating messages that are to be sent to other vehicles (for V2V communications), to pedestrian UEs (for V2P communications), and/or to infrastructure systems (for V2I communications). In some cases, the communications system 258 and/or the ITS 255 can obtain car access network (CAN) information (e.g., from other components of the vehicle via a CAN bus). In some examples, the communications system 258 (e.g., a TCU NAD) can obtain the CAN information via the CAN bus and can send the CAN information to the ITS stack. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 255.

The conditions used to determine whether to generate messages can be determined using the CAN information based on safety-related applications and/or other applications, including applications related to road safety, traffic efficiency, infotainment, business, and/or other applications. In one illustrative example, ITS 255 can perform lane change assistance or negotiation. For instance, using the CAN information, the ITS 255 can determine that a driver of the vehicle 204 is attempting to change lanes from a current lane to an adjacent lane (e.g., based on a blinker being activated, based on the user veering or steering into an adjacent lane, etc.). Based on determining the vehicle 204 is attempting to change lanes, the ITS 255 can determine a lane-change condition has been met that is associated with a message to be sent to other vehicles that are nearby the vehicle in the adjacent lane. The ITS 255 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 204, such as based on V2P communications with a UE of the user), traffic sign recognition, among others.

The ITS 255 can use any suitable protocol to generate messages (e.g., V2X messages). Examples of protocols that can be used by the ITS 255 include one or more Society of Automotive Engineering (SAE) standards, such as SAE J2735, SAE J2945, SAE J3161, and/or other standards, which are hereby incorporated by reference in their entirety and for all purposes.

A security layer of the ITS 255 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS stack can be signed by the security layer. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 255 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 252) to perform automatic functions, such as automatic breaking, automatic steering (e.g., to maintain a heading in a particular lane), automatic lane change negotiation with other vehicles, among other automatic functions. In one illustrative example, a message can be received by the communications system 258 from another vehicle (e.g., over a PC5 interface) indicating that the other vehicle is coming to a sudden stop. In response to receiving the message, the ITS 255 can generate a message or instruction and can send the message or instruction to the control system 252, which can cause the control system 252 to automatically break the vehicle so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 255 can receive a large number of messages from the other UEs (e.g., vehicles, RSUs, etc.), in which case the ITS 255 will authenticate (e.g., decode and decrypt) each of the messages and/or determine which operations to perform. Such a large number of messages can lead to a large computational load for the vehicle computing system 250, which can cause a temperature of the computing system 250 to increase. As described in more detail below, one or more functionalities can be transitioned from the vehicle 204 to another device (e.g., a user device, a RSU, etc.) based on a temperature of the vehicle computing system 250 (or component thereof) exceeding or approaching one or more thermal levels. Transitioning the one or more functionalities can reduce the computational load on the vehicle 204, helping to reduce the temperature of the components.

The computing system 250 further includes one or more sensor systems 256 (e.g., a first sensor system through an Nth sensor system, where N is a value equal to or greater than 0). When including multiple sensor systems, the sensor system(s) 456 can include different types of sensor systems that can be arranged on or in different parts the vehicle 204. The sensor system(s) 456 can include one or more camera sensor systems, Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 250 of the vehicle 204.

While the vehicle computing system 250 is shown to include certain components and/or systems, one of ordinary skill will appreciate that the vehicle computing system 250 can include more or fewer components than those shown in FIG. 2. For example, the vehicle computing system 250 can also include one or more input devices and one or more output devices (not shown). In some implementations, the vehicle computing system 250 can also include (e.g., as part of or separate from the control system 252, the infotainment system 254, the communications system 258, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 3:
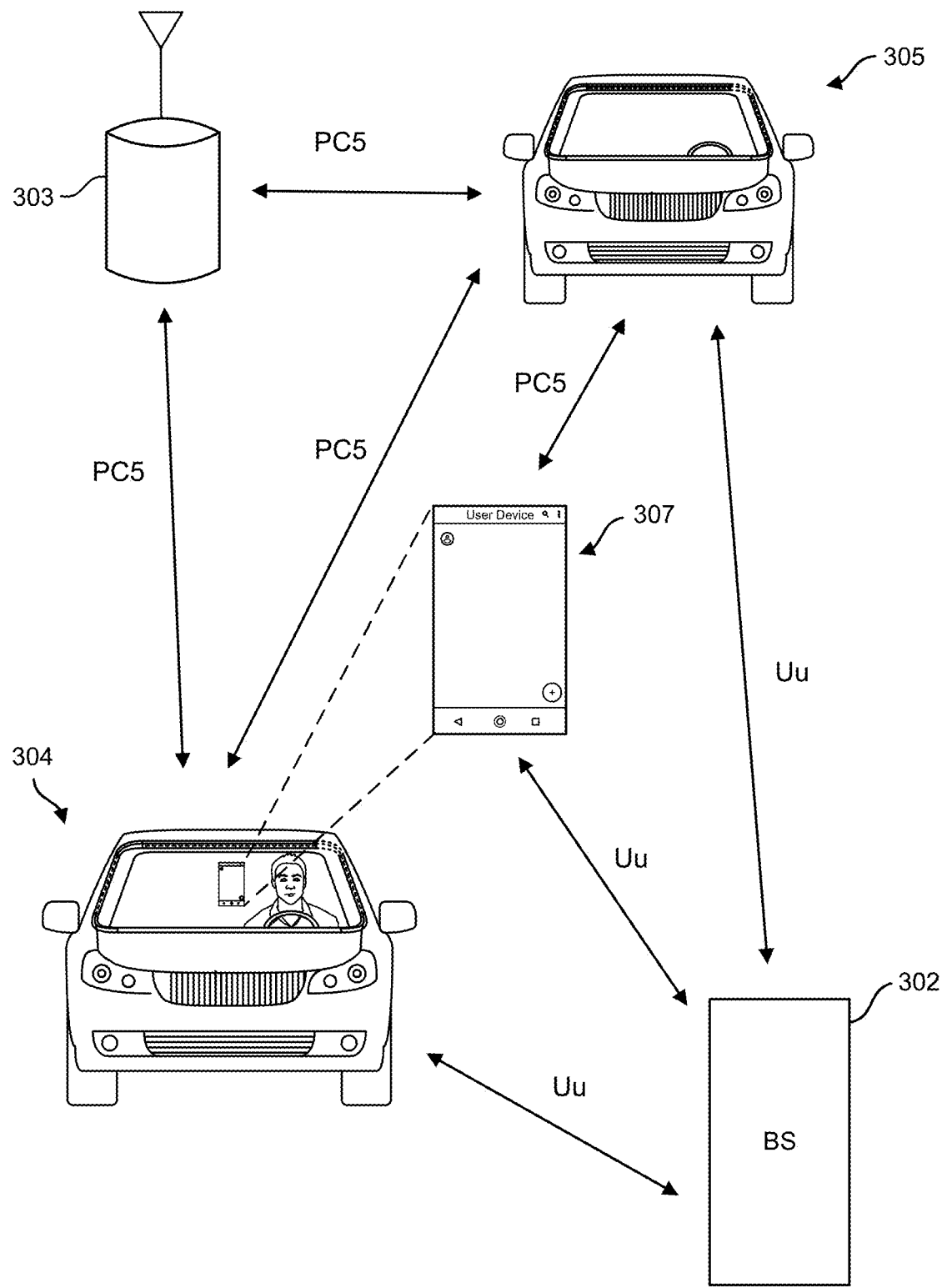
FIG. 3 is a block diagram illustrating an example of a computing system of a vehicle, according to aspects of the disclosure.

FIG. 3 illustrates examples of different communication mechanisms used by various UEs. In one example, FIG. 3 illustrates a vehicle 304, a vehicle 305, and a roadside unit (RSU) 303 communicating with each other using PC5 signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface, as shown in FIG. 3.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
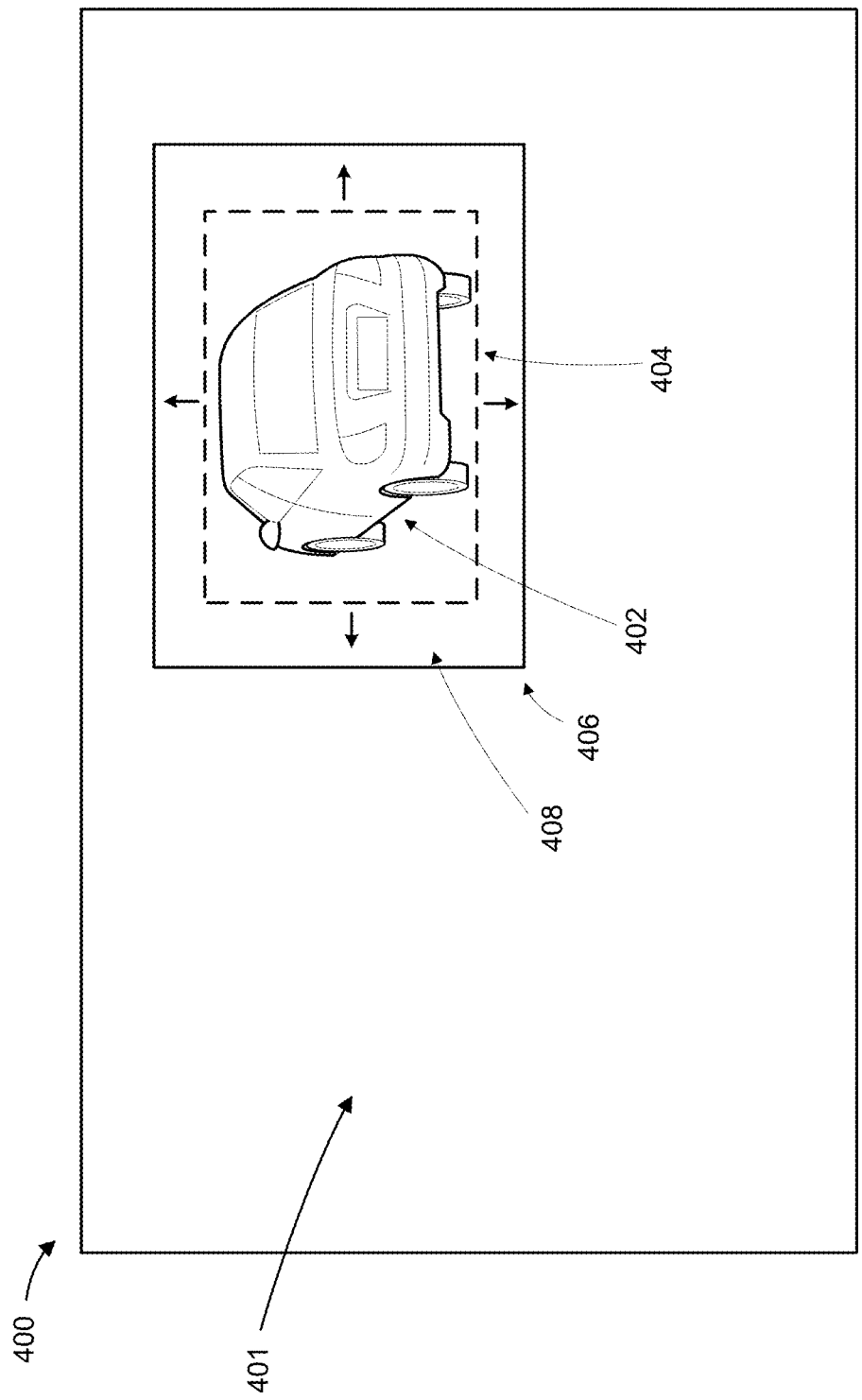
FIG. 4 is a conceptual diagram illustrating a display on which object detection and tracking is performed by a tracking object on a target object, in accordance with some examples.

As described above, systems and techniques are described herein that provide improvements to object detection and tracking. FIG. 4 is a conceptual diagram illustrating a display 400 on which object detection and tracking can be performed by a tracking object to detect and track one or more target objects (e.g., a target vehicle as shown in FIG. 4). In some instances, display 400 can be configured to display images (or image frames) that contain objects being tracked by a tracking object (not illustrated). In the example of FIG. 4, the tracking object can include a tracking vehicle (also referred to as an ego vehicle). Display 400 can be a display screen, digital mirror, or other display device that is configured to display information and images to facilitate the navigation, planning and/or routing functions of a tracking device, such as a vehicle. By way of example, a target object 402 can be vehicle, and the tracking object can be another vehicle (not illustrated), that is performing detection and tracking operations to improve navigation and safety. As illustrated in the example of FIG. 4, display 400 can be configured to display images, such as image 401, that can be collected from an environment around the tracking object, e.g., by an image capture device, such as a camera. It is understood that the target object and tracking object can include various other object types, such as other types of vehicles, without departing from the scope of the disclosed technology.

In operation, the tracking object can receive (or capture) sensor data, such as image data for the surrounding environment. The sensor data may include data from various sensor types, including one or more Light Detection and Ranging (LiDAR) sensors, radar, sensors, and/or ultrasonic sensors, etc. Additionally, the tracking object can receive one or more messages (e.g., a first set of messages) from the target object 402. In some implementations, the messages can include one or more messages (e.g., V2X messages, DSRC messages, or other type of message), for example, that include velocity, pose, and/or size information for target object 402. The pose can include three-dimensional (3D) position (e.g., including horizontal (x), vertical (y), and depth (z) dimensions) and 3D orientation (e.g., including pitch, roll, and yaw).

In some aspects, the tracking object may perform tracking on the target object 402 using the collected sensor data (e.g., image data, LiDAR data, and/or radar data, etc.). By way of example, camera image data may be provided to a tracking system to determine a size of the tracking object, as well as to estimate or determine various kinematic properties of the target object 402, such as a velocity, acceleration, and/or pose of the target object. A determined size and pose of the target object 402 can be used to place an initial bounding box 404 around the target object 402. As shown in FIG. 4, the initial bounding box 404 is sized to encompass an area of image 401 that encloses the target object 402. Based on the determined kinematic properties, the tracking system can infer (or determine) a location of the target object 402, even in instances where sensor data for the target object 402 cannot be directly collected, such as in instances where the target object 402 becomes occluded from a field of view of one or more sensors (such as one or more cameras) of the tracking object. In such approaches, the tracking system may utilize machine-learning models, e.g., to determine or predict kinematic properties of the target object, and to determine or predict a trajectory of the target object 402. Further details regarding the use of machine-learning techniques are discussed in relation to FIG. 7, below.

In some approaches, the tracking object may compare received or collected sensor data with the information in the received messages, for example, to validate or verify the message information. By way of example, the tracking object may compare various features of the target object 402 (e.g., a location, size and/or pose of the target object), as determined from collected camera image data, with corresponding features of the target object 402 reported by the information in the received messages. In this manner, the collected sensor information can be used to validate the message information, for example, to determine if the reported message information is incorrect. In some implementations, the tracking object may classify incorrectly reported message information as being faulty or 'spoofed.'

In some aspects, the tracking object may perform tracking on the target object 402 using the information in the received messages. For example, using the received image data, an object detection and tracking system of the tracking object can determine (or calculate) an initial bounding box 404 identifying a position or location of the target object 402 in the image. As shown in FIG. 4, the initial bounding box 404 is sized to encompass an area of image 401 that encloses the target object 402.

In some cases, the pose (e.g., the 3D position and orientation) of the tracking object included in the messages (e.g., V2X, DSRC, etc.) is in a global reference frame (e.g., in an ECEF reference frame). The object detection and tracking system of the tracking object can project the pose of the tracking object from the global reference frame to a two-dimensional (2D) plane of the image (referred to as an image plane). The pose information included in one or more messages (e.g., V2X, DSRC, etc.) transmitted by the target object and received by the tracking object can include a translation vector $t_{eo}$ describing the target object position with respect to a global reference frame e (e.g., an ECEF reference frame) and a rotation matrix $R_{eo}$ describing the target object orientation with respect to the global reference frame e. As noted above, the pose information can be determined by the target object based on GPS/GNSS information received by the target object. Further, the tracking object can determine a translation vector $t_{ec}$ and a rotation matrix $R_{ec}$ (e.g., based on received GPS/GNSS information), describing the tracking object position and orientation (e.g., camera position and orientation) with respect to the global reference frame e. The object detection and tracking system of the tracking object can then determine the position of the target vehicle with respect to the tracking vehicle (e.g., the tracking vehicle camera) camera by determining the translation vector $t_{co}=R_{ec}^T (t_{eo}-t_{ec})$. Here $(.)^T$ denotes the transpose operator. The object detection and tracking system of the tracking object can determine the orientation of the target vehicle with respect to the tracking vehicle by determining the rotation matrix $R_{co}=R_{ec}^T R_{eo}$.

Figure 5C:
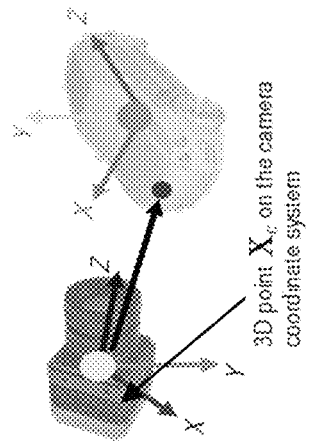
FIGS. 5A-5C are diagrams illustrating an example of coordinate transformations from an object coordinate system to a camera coordinate system, in accordance with some examples.
Figure 5B:
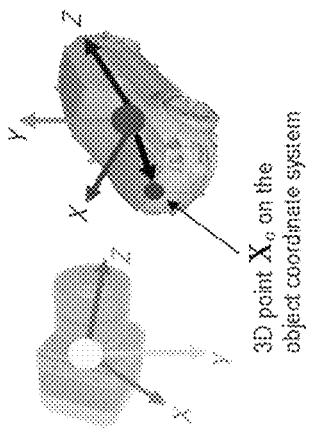
Figure 5A:
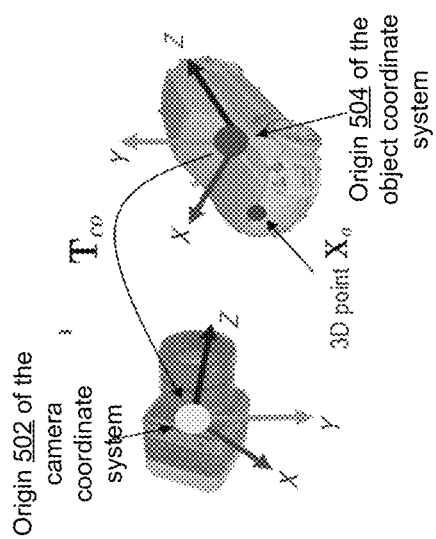

Illustrative examples of coordinate transformations that can be used for such a projection are shown in FIG. 5A-FIG. 5E. For example, FIG. 5A-5C are diagrams illustrating an example of coordinate transformations from an object coordinate system to a camera coordinate system. FIG. 5A illustrates the origin 502 of the camera coordinate system (also referred to as the camera center), a 3D point $X_O$ from a plurality of 3D points in an object coordinate system, and the origin 504 of the object coordinate system. A transformation matrix $T_{co}$ is also shown. As illustrated in FIG. 5A, FIG. 5B, and FIG. 5C, the points (including the point $X_O$) on the object coordinate system are transformed into points (including point $X_C$) on the camera coordinate system. In some examples, the following equation can be used to compute the transformation:

$$\hat{X}_c = \begin{bmatrix} X_c \\ 1 \end{bmatrix} = T_{co}\hat{X}_o = T_{co}\begin{bmatrix} X_o \\ 1 \end{bmatrix} = \begin{bmatrix} R_{co}X_o + t_{co} \\ 1 \end{bmatrix} \quad \text{Equation (1)}$$

In this equation, R includes the rotational parameters of the camera (e.g., pitch, yaw, and/or roll), and t is a translation vector (e.g., the physical location of the camera). Rotation and translation are intrinsic parameters of the camera. The rotational parameters R can be expressed using the following equation:

$$R = \begin{bmatrix} 1 & 0 & 0 \\ 0 & \cos\gamma & -\sin\gamma \\ 0 & \sin\gamma & \cos\gamma \end{bmatrix}\begin{bmatrix} \cos\beta & 0 & \sin\beta \\ 0 & 1 & 0 \\ -\sin\beta & 0 & \cos\beta \end{bmatrix}\begin{bmatrix} \cos\alpha & -\sin\alpha & 0 \\ \sin\alpha & \cos\alpha & 0 \\ 0 & 0 & 1 \end{bmatrix} \quad \text{Equation (2)}$$

In the above equation, α is the yaw (horizontal rotation), β is the pitch (up-and-down rotation), and γ is the roll (side-to-side rotation). The pitch, roll, and yaw relative to a camera can be conceptualized as the yaw being the camera's horizontal rotation relative to the ground (e.g., left-to-right relative to the horizontal axis), the pitch being the camera's vertical rotation relative to the ground (e.g., up and down relative to the horizontal axis), and the roll being the camera's side-to-side rotation relative to the horizon (e.g., side-to-side relative to the horizontal axis). The translation vector t can be expressed as:

$$t = \begin{bmatrix} X_T \\ Y_T \\ Z_T \end{bmatrix} \quad \text{Equation (3)}$$

This mapping is also referred to as a projective transformation. The camera's intrinsic parameters can be expressed as follows:

$$K = \begin{bmatrix} f_x & S & x_c \\ 0 & f_y & y_c \\ 0 & 0 & 1 \end{bmatrix} \quad \text{Equation (4)}$$

In the above matrix, $f_x$ and $f_y$ are the focal length of the camera along the x and y axis, respectively; $(x_c, y_c)$ is the center of the image plane 505; and S is a skew factor. Skew occurs when the 3D camera reference system 508 is not precisely perpendicular to the image plane 505. The camera's intrinsic parameters, K, can next be used to map P' from the 3D camera reference system 508 to the image plane 505.

Figure 5D:
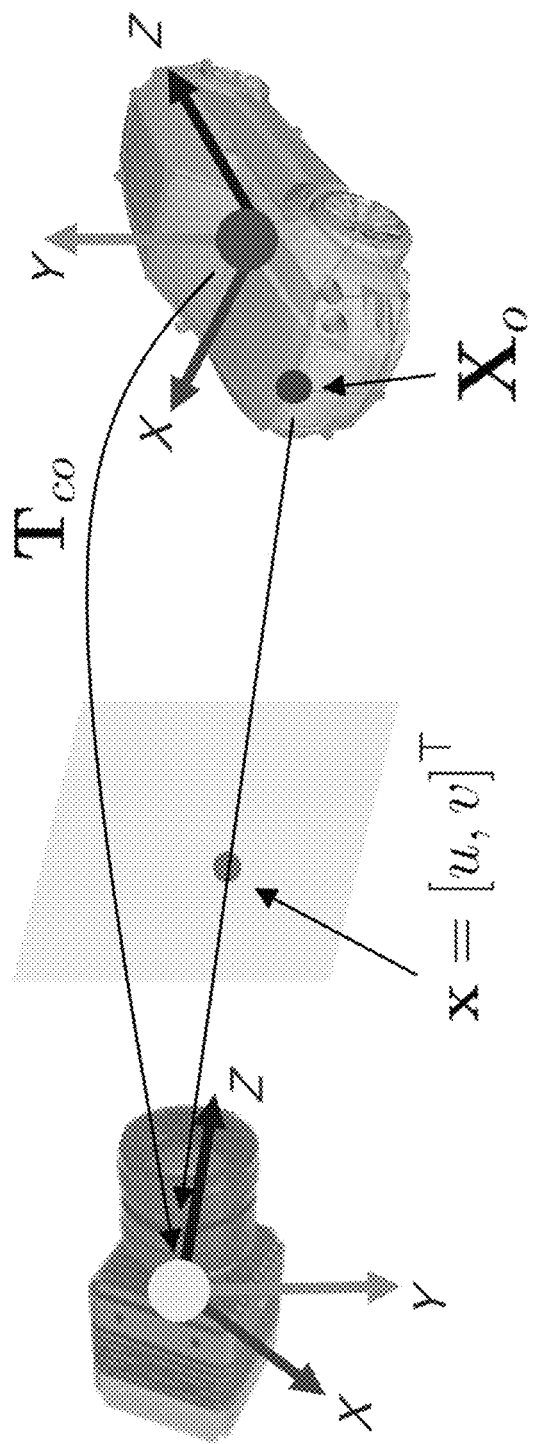
FIG. 5D is a diagram illustrating an example of a projection of a three-dimensional point on an object coordinate system to a two-dimensional point on an image, in accordance with some examples.
Figure 5E:
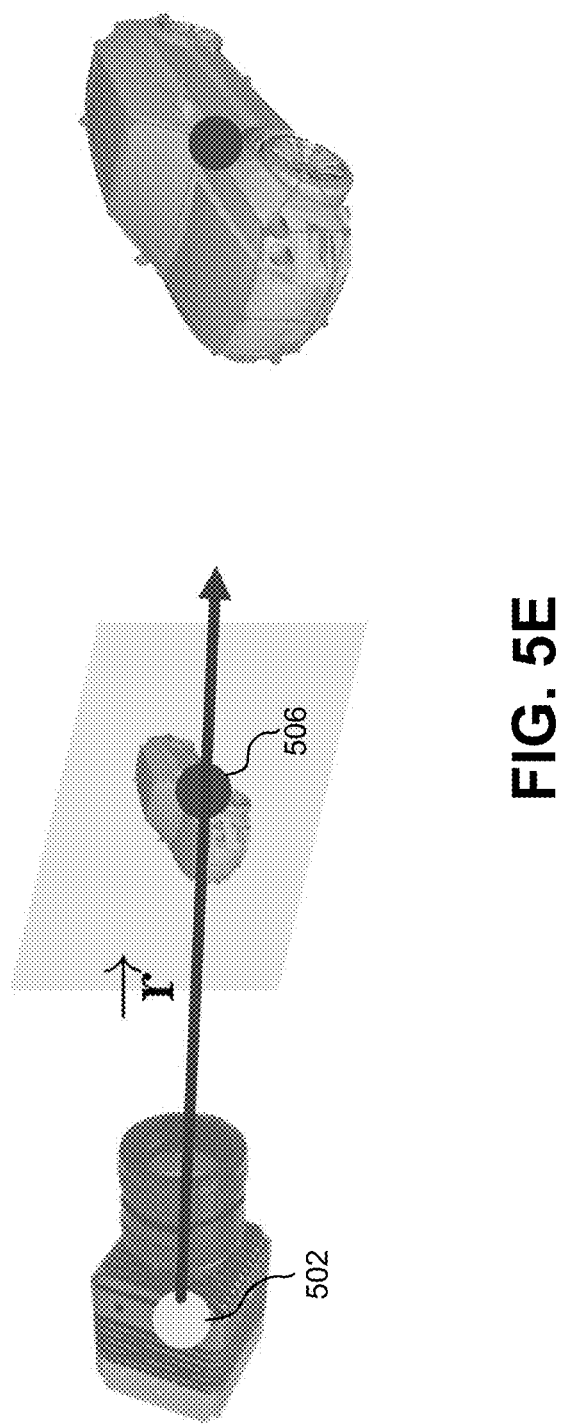
FIG. 5E is a diagram illustrating an example of back-projection of a two-dimensional point on an image to a camera coordinate system, in accordance with some examples.

FIG. 5D is a diagram illustrating an example of a projection of the 3D point $X_O$ on the object coordinate system (from FIG. 5A-FIG. 5C) to a 2D point on the image. The 3D point $X_O$ on the object coordinate system can include a vertex on a 3D model of the object illustrated in the image. In some examples, the 3D point $X_O$ can projected to a 2D point on the image using the following equation:

$$PT_{co}\hat{X}_o = PT_{co}\begin{bmatrix} X_o \\ 1 \end{bmatrix} =$$

$$P\begin{bmatrix} R_{co}X_o + t_{co} \\ 1 \end{bmatrix} = P\hat{X}_c = P\begin{bmatrix} X_c \\ 1 \end{bmatrix} = KX_c = \begin{bmatrix} \hat{x} \\ \hat{y} \\ \hat{z} \end{bmatrix} = \hat{x}$$

$$x = \begin{bmatrix} u \\ v \end{bmatrix} = \begin{bmatrix} \frac{\hat{x}}{\hat{z}} \\ \frac{\hat{y}}{\hat{z}} \end{bmatrix}$$

Equation (5)

Continuing with the examples from FIG. 5A-FIG. 5D, FIG. 5E is a diagram illustrating an example of back-projection of a 2D point on an image to a camera coordinate system. Given a 2D image, the ray direction from each pixel can be determined. However, the depth (a distance from the origin 502 (or camera center) to a 3D point) is not known. For instance, back-projection of a 2D pixel point 506 can be computed as a directional vector as follows:

$$\vec{r} = K^{-1}\hat{x} \quad \text{Equation (6)}$$

In the above matrix, $f_x$ and $f_y$ are the focal length of the camera along the x and y axis, respectively; $(x_c, y_c)$ is the center of the image plane 505; and S is a skew factor. Skew occurs when the 3D camera reference system 508 is not precisely perpendicular to the image plane 505.

Returning to FIG. 4, in some implementations, the initially calculated bounding box 404 can be resized based on uncertainty measures associated with determining the pose of the tracking object and/or the target object 402. For example, uncertainty in the measurements of the pose of the tracking object and/or target object can be used to resize the initial bounding box 404. By way of example, a new bounding box 406 can be determined based on the dimensions of the initial bounding box 404, as well as uncertainty measures for the pose of the tracking object and the target object 402. As illustrated in the example of FIG. 4, bounding box 406 can be configured to contain a sub-image 408 of image 401 that has a high statistical likelihood of encompassing the target object 402. The sub-image 408 can then be extracted from bounding box 406 and used by the object detection and tracking system of the tracking object to perform object detection and tracking of the target object 402. By way of example, the object detection and tracking system of the tracking object can perform detection and tracking to identify and track the position (or location) and movement of a vehicle (as an example of the target object 402) in order to facilitate navigation and planning operations by the tracking object.

In some approaches, object detection can be performed for the sub-image 408 using a machine-learning (ML) based classifier, such as a deep neural network. In such instances, the sub-image 408 may be further pre-processed before being provided to the detection model. For instance, the height and/or width of sub-image 408 may be adjusted or scaled, for example to increase or decrease a pixel height and/or width of the sub-image 408 before it is provided to the detection model. In one illustrative example, the extracted sub-image 408 can be scaled to a fixed canonical size (e.g., so that the sub-image is 100 pixels wide, 200 pixels wide, 100 pixels high, 200 pixels high, or other width and/or height). The object detection model can then perform object detection on the extracted and scaled sub-image 408. Because the sub-image is smaller than the original image, the computational burden of performing object detection is significantly reduced as less image area needs to be processed by the object detector. Further, because the scale of the tracking object in the image has been normalized (based on the scaling of the sub-image to the fixed size), a machine-learning based object detector can be trained to process images having tracking objects (e.g., tracking vehicles) of that width. The object detection and tracking system can scale the sub-image back to the original size and can account for the sub-image position, which can result in the object detection and tracking system obtaining an accurate bounding box of the target object in an original digital display (e.g., in a full digital display mirror image).

The object detection and tracking system of the tracking object can perform subsequent and continued tracking of the target object 402 in one or more subsequent images (that follow the image upon which object detection is performed) using one or more object trackers. Further details regarding the detection and tracking of a target object through multiple images is discussed in further detail with respect to FIG. 6.

Figure 6:
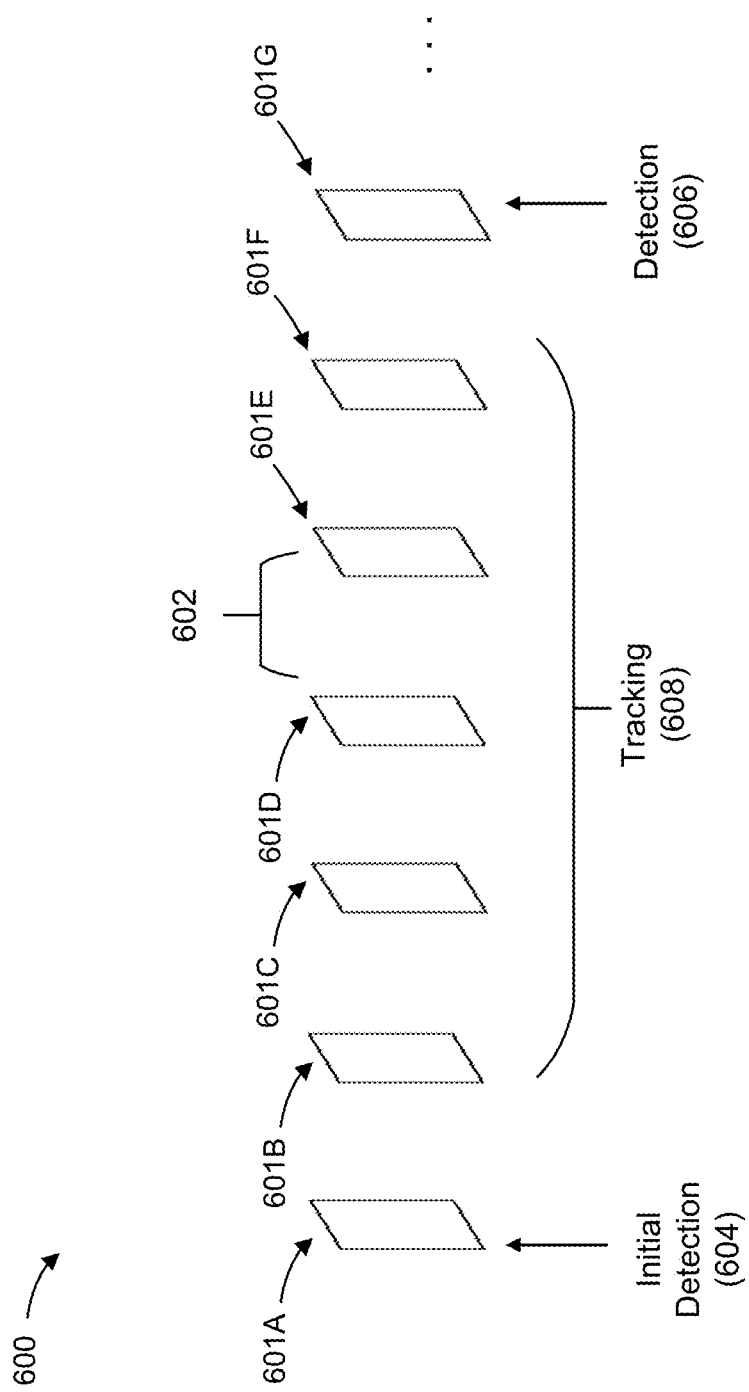
FIG. 6 illustrates an object detection and tracking process that is performed across multiple images, in accordance with some examples.

In particular, FIG. 6 illustrates an object detection and tracking process 600 that is performed across multiple images 601 (e.g., 601A-601G). The tracking of a target object (e.g., target object 402) can begin with an initial object detection (shown in FIG. 6 as initial detection 604) that is performed for a first image 601A. As discussed above, a target object (e.g., target object 402) can be detected within a sub-image (e.g., sub-image 408) that is extracted from a received image (e.g., image 401). In some examples, the object detection not only identifies a position or location of the target object within the sub-image, but also identifies a position or location of the target object within the image. Subsequent location of the target object (e.g., in subsequent images) can be performed using an object tracker, such as a Kalman filter, an extended Kaman filter, a particle filter, or a combination thereof. In some cases, the state of such a filter is the relative position of the target object (e.g., target vehicle) in the reference frame of the tracking object (e.g., the tracking or ego vehicle reference frame). For instance, the target object can be tracked in 3D space (as opposed to the projection of the target object in the image plane). In some examples, the object tracker can be initialized using localization information determined by the object detection model (e.g., horizontal and vertical position states of the target object) and/or pose information from one or more messages (e.g., V2X and/or DSRC messages) received from the target object. For instance, the accurate detected bounding box from object detection can be used to initialize the horizontal and vertical position states of the object tracker (e.g., by projecting the bounding box to the image plane using the back-projection technique described above, such as based on equation (6)), and the pose information derived from the messages (e.g., V2X and/or DSRC messages) can be used to initialize the depth position state of the object tracker.

In the example of FIG. 6, a target object location and/or pose can be tracked in images 601B-601F (shown in FIG. 6 as tracking 608), for example, based on one or more V2X and/or DSRC messages that are received from the target object after object detection is performed on a sub-image extracted from image 601A (e.g., the sub-image 408). For instance, as noted above, the V2X messages can include velocity information indicating a velocity of the target object (e.g., a target vehicle). The velocity can include a direction (e.g., including horizontal (x) and vertical (y) direction) and speed. The object tracker can determine a position of a bounding box in a current image (e.g., image 601B) by moving the bounding box from the position in a previous image (e.g., image 601A that is the image before image 601b) by an amount that is a function of the velocity. For instance, in some cases, the velocity information included in a message (e.g., a V2X or DSRC message) can be given in 3D. The object detection and tracking system can use the 3D velocity information to determine an updated 3D position of the target vehicle. The object detection and tracking system can then project the updated position of the vehicle onto the camera image plane (e.g., by performing the projection described above with respect to FIG. 5A-FIG. 5E. The projected position of the vehicle defines the new bounding box. In some examples, the 3D velocity vector can be projected onto the camera image plane, and that projected velocity vector can be used to directly move the bounding box.

In some cases, the tracking object can receive subsequent V2X and/or DSRC messages from the target object that include updated information, including an updated velocity of the target vehicle. When a V2X and/or DSRC received message indicates an updated velocity of the target vehicle, the object detection and tracking system of the tracking vehicle can use the updated velocity to perform the object tracking. For example, if one or more V2X and/or DSRC messages received relative to image 601A indicate a first velocity of the target vehicle, the object detection and tracking system of the tracking vehicle can use the first velocity to perform object tracking of the target vehicle for images 601B, 601C, and 601D. In such an example, the tracking vehicle can receive one or more additional V2X and/or DSRC messages that include an updated velocity (referred to as a second velocity) of the target vehicle. The object detection and tracking system can use the second velocity to perform the object tracking for frames 601E and 601F.

By using received wireless messages (e.g., various V2X message sets) to perform tracking on subsequent images, tracking can be performed in instances where the target object may be occluded by other objects in the image. The propagation of the object tracker (e.g., the filter) is computationally inexpensive as the object tracker state is relatively small. Further, when based on velocity estimates included in the wireless messages, such as V2X and/or DSRC messages), the object tracker is highly accurate (e.g., on the order of 5 to 10 cm/s accurate) as compared to the position estimates based on GPS, GNSS, etc. Further to the example illustrated with respect to FIG. 4, tracking of target object 402 (a vehicle) may be performed for subsequent images, for example that are displayed on a digital mirror device, even if the target object becomes occluded by other objects in subsequent images, such as other vehicles on a roadway.

In some implementations, the object detection process may be repeated for the target object in subsequent images. In the example of FIG. 6, object detection is repeated (shown in FIG. 6 as detection 606) for image 601G. It is understood that a cadence of object detection can be based on a number of factors, including but not limited to an availability of computational resources, a message receipt frequency, uncertainty measures for one or more received message sets (e.g., indicating an amount of error in velocity, and/or pose estimates), and/or a frame rate 602 of image collection, etc. By way of example, detection may be performed once a second, once every one-half second, etc. In some cases, the sub-image that is extracted from a larger image can be made tighter or smaller as compared to the size determined based on the uncertainty described above, as better prior information about the position of the target object in the original image (e.g., the digital display mirror image) is available from the object tracker (e.g., filter) used to track the target object (e.g., target vehicle).

By periodically repeating the detection process, the resulting accurate bounding box can be used to update object tracker (e.g., the filter) being used to track the target object. Repetition of object detection can prevent drifting of the bounding box determined using object tracking (and in turn preventing drifting of the bounding box displayed on a digital display, such as a digital display mirror of a tracking vehicle). Moreover, periodically repeating object detection can result in a high accuracy of object detection and localization being maintained across several images, e.g., for extended time periods, while also reducing computation overhead by limiting the use of object detection models.

Figure 7:
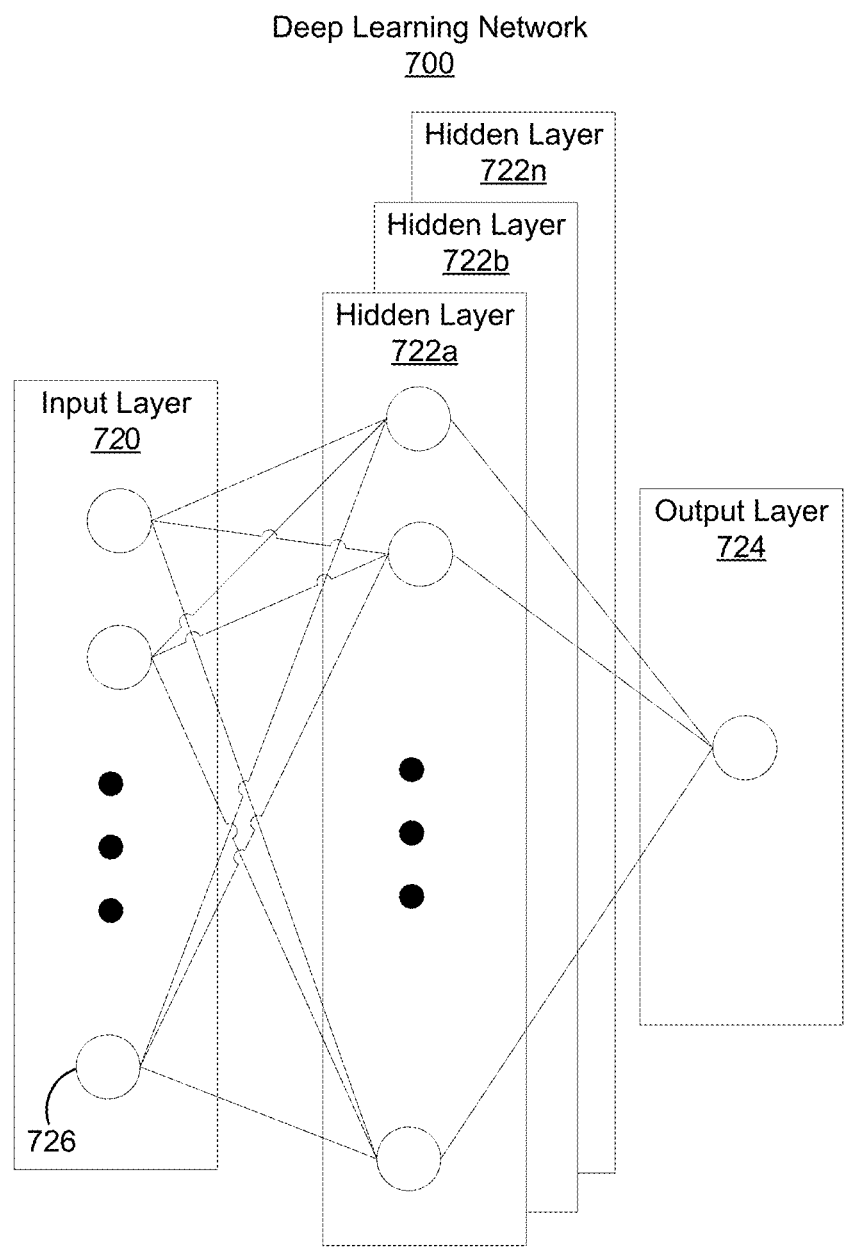
FIG. 7 a block diagram illustrating an example of a deep neural network, in accordance with some examples.

As noted above, the object detection and tracking system can use a machine-learning based object detector (e.g., based on a deep neural network) to perform object detection. FIG. 7 is an illustrative example of a deep neural network 700 that can be used to perform object detection on a sub-image containing a target object, such as target object 402 located in sub-image 408, as discussed above. Deep neural network 700 includes an input layer 720 that is configured to ingest input data, such as pre-processed (scaled) sub-images that contain a target object for which detection is to be performed. In one illustrative example, the input layer 720 can include data representing the pixels of an input image or video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n. In one illustrative example, the output layer 724 can provide a classification for an object in an image or input video frame. The classification can include a class identifying the type of object (e.g., a person, a dog, a cat, or other object).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the hidden layers 722a, 722b, through 722n can transform the information of each input node by applying activation functions to this information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to identify objects in images, the neural network 700 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
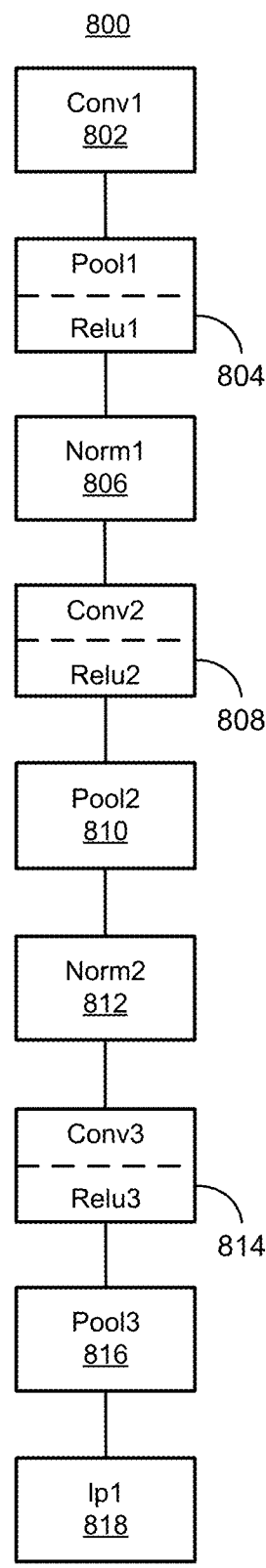
FIG. 8 is a diagram illustrating an example of the Cifar-10 neural network, in accordance with some examples.

FIG. 8 is a diagram illustrating an example of the Cifar-10 neural network 800. In some cases, the Cifar-10 neural network can be trained to classify specific objects, such as vehicles only. As shown, the Cifar-10 neural network 800 includes various convolutional layers (Conv1 layer 802, Conv2/Relu2 layer 808, and Conv3/Relu3 layer 814), numerous pooling layers (Pool1/Relu1 layer 804, Pool2 layer 810, and Pool3 layer 816), and rectified linear unit layers mixed therein. Normalization layers Norm1 806 and Norm2 812 are also provided. A final layer is the ip1 layer 818.

Another deep learning-based detector that can be used to detect or classify objects in images includes the SSD detector, which is a fast single-shot object detector that can be applied for multiple object categories or classes. Traditionally, the SSD model is designed to use multi-scale convolutional bounding box outputs attached to multiple feature maps at the top of the neural network. Such a representation allows the SSD to efficiently model diverse box shapes, such as when the size of an object is unknown in a given image. However, using the systems and techniques described herein, the sub-image extraction and the width and/or height scaling of the sub-image can allow an object detection and tracking system to avoid having to work with diverse box shapes. Rather, the object detection model of the detection and tracking system can perform object detection on the scaled image in order to detect the position and/or location of the object (e.g., a target vehicle) in the image.

Figure 9A:
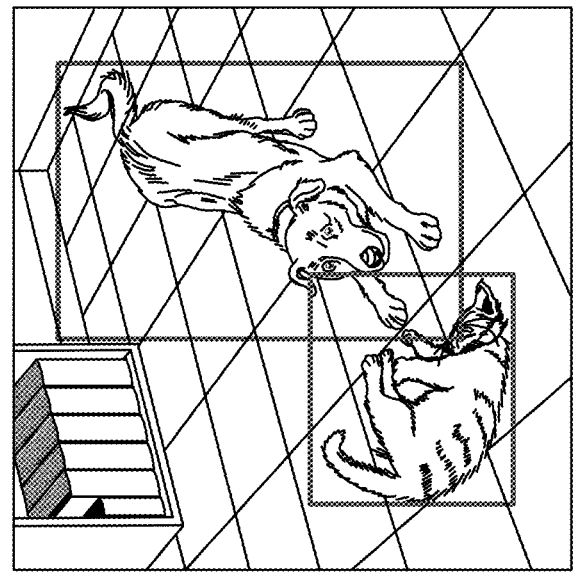
FIGS. 9A-9C are diagrams illustrating an example of a single-shot object detector, in accordance with some examples.
Figure 9B:
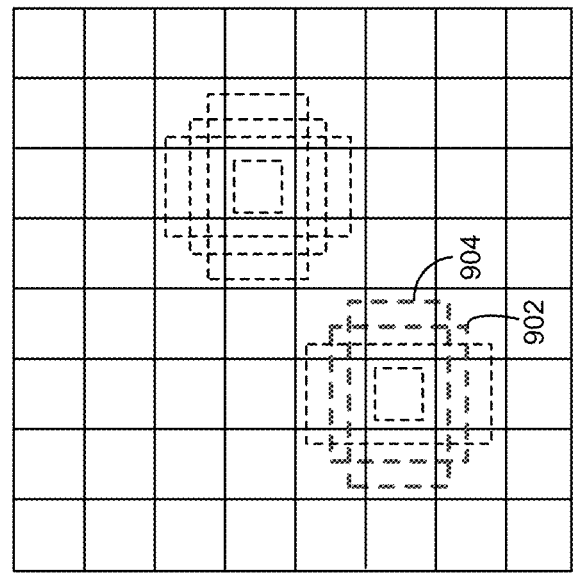
Figure 9C:
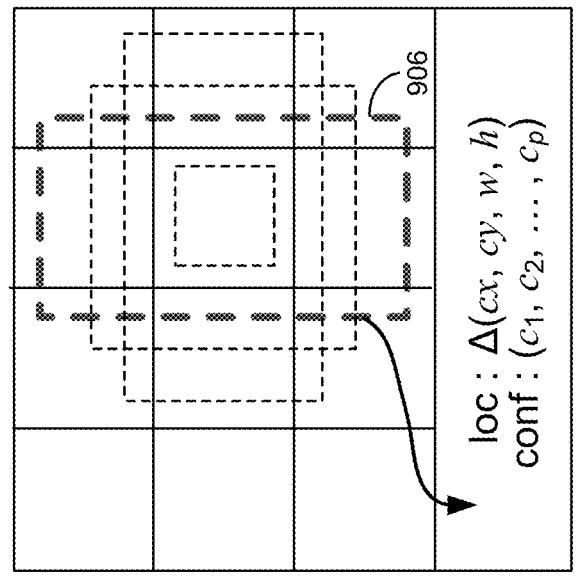

FIG. 9A-9C are diagrams illustrating an example of a single-shot object detector that models diverse box shapes. FIG. 9A includes an image and FIG. 9B and FIG. 9C include diagrams illustrating how an SSD detector (with the VGG deep network base model) operates. For example, SSD matches objects with default boxes of different aspect ratios (shown as dashed rectangles in FIG. 9B and FIG. 9C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (box 902 and box 904 in FIG. 9B) are matched with the cat, and one of the 4×4 boxes (box 906 in FIG. 9C) is matched with the dog. SSD has multiple features maps, with each feature map being responsible for a different scale of objects, allowing it to identify objects across a large range of scales. For example, the boxes in the 8×8 feature map of FIG. 9B are smaller than the boxes in the 4×4 feature map of FIG. 9C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 9A, all probability labels would indicate the background class with the exception of the three matched boxes (two for the cat, one for the dog).

As noted above, using the systems and techniques described herein, the number of scales is reduced to the scaled sub-image, upon which an object detection model can perform object detection to detect the position of an object (e.g., a target vehicle).

Figure 10C:
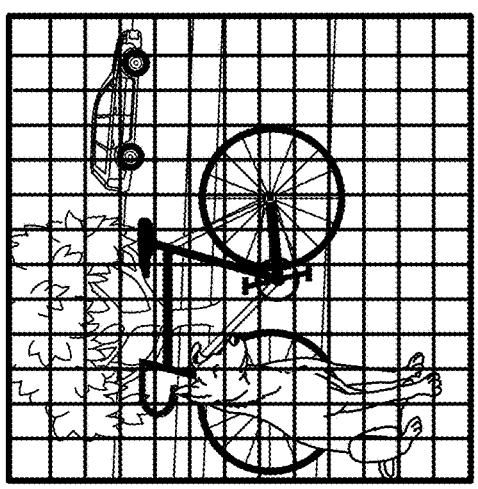
FIGS. 10A-10C are diagrams illustrating an example of a You Only Look Once (YOLO) detector, in accordance with some examples.
Figure 10B:
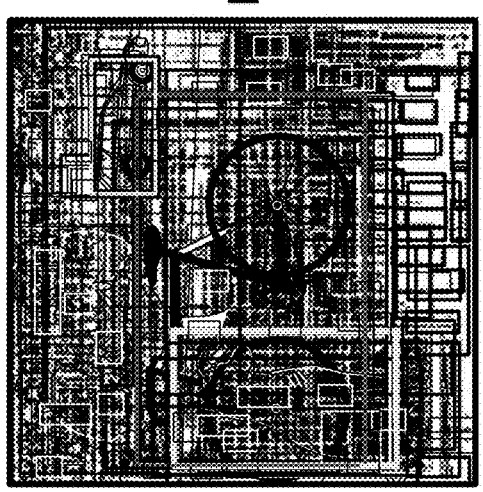
Figure 10A:
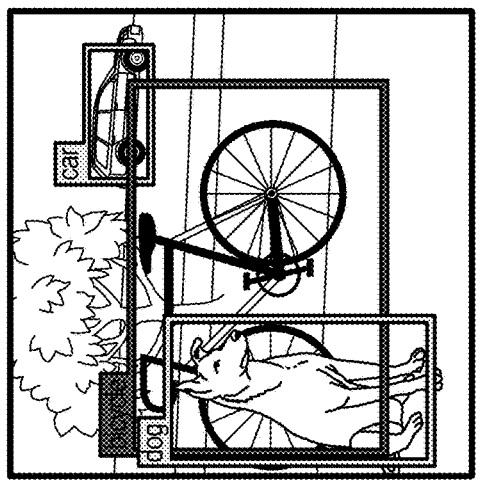

Another deep learning-based detector that can be used by an object detection model to detect or classify objects in images includes the You only look once (YOLO) detector, which is an alternative to the SSD object detection system. FIG. 10A-10C are diagrams illustrating an example of a you only look once (YOLO) detector, in accordance with some examples. In particular, FIG. 10A includes an image and FIG. 10B and FIG. 10C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 10A, the YOLO detector divides the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 10B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the gray box with thick borders on the left side of the image in FIG. 10B is 85% sure it contains the object class "dog." There are 169 grid cells (13×13) and each cell predicts 5 bounding boxes, resulting in 1745 bounding boxes in total. Many of the bounding boxes will have very low scores, in which case only the boxes with a final score above a threshold (e.g., above a 30% probability, 40% probability, 50% probability, or other suitable threshold) are kept. FIG. 10C shows an image with the final predicted bounding boxes and classes, including a dog, a bicycle, and a car. As shown, from the 1745 total bounding boxes that were generated, only the three bounding boxes shown in FIG. 10C were kept because they had the best final scores.

Figure 11:
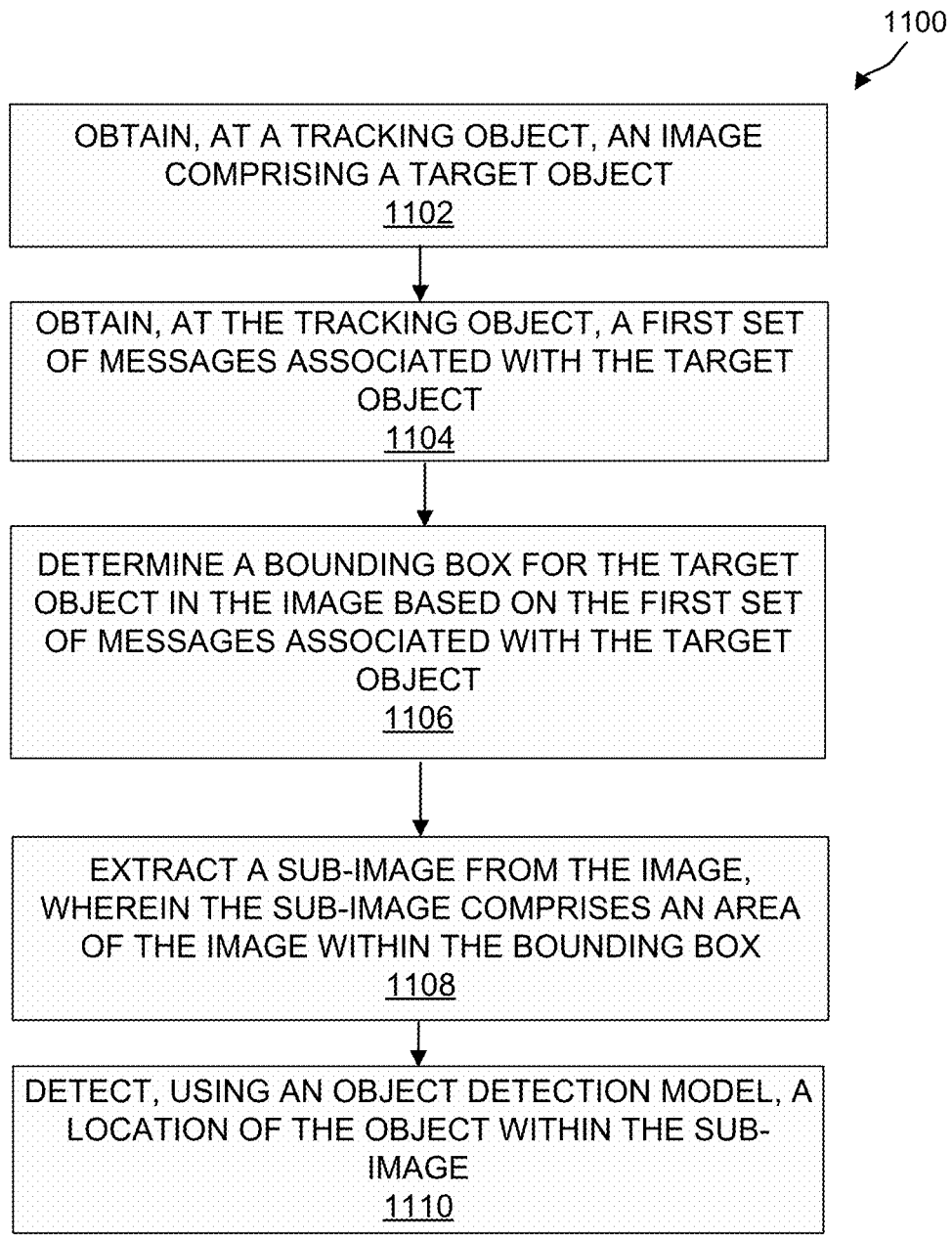
FIG. 11 is a flowchart illustrating an example of a process for performing object detection and tracking using the techniques described herein, in accordance with some examples.

FIG. 11 is a flow diagram illustrating an example of a process 1100 for performing object detection and tracking, according to some aspects of the disclosed technology. In some implementations, the process 1100 can include, at step 1102, obtaining, at a tracking object, an image comprising a target object. As discussed above, the image can be received (or captured) at a tracking object, such as a vehicle that includes an object detection and tracking system of the disclosed technology. In such approaches, the image can be collected by one or more vehicle sensors, such as one or more vehicle cameras that are configured to record/capture images of various target object (e.g., other vehicles) in an environment surrounding the tracking object.

In some implementations, the process 1100 can include, at step 1104, obtaining at the tracking object a first set of messages associated with the target object. Further to the examples discussed above with respect to FIGS. 4 and 6, the received messages can include wireless messages (e.g., Vehicle-to-Everything (V2X) wireless messages, Dedicated Short-Range Communications (DSRC) wireless messages, and/or other types of messages) that are transmitted by the target object and received by the tracking object. As such, the messages (e.g., V2X messages, DSRC message, etc.) can specify velocity, pose, and/or size information about the target object.

In some examples, the process 1100 can include, at step 1106, determining a bounding box for the target object in the image based on the first set of messages associated with the target object. In some examples, the bounding box can be based on pose estimates, size estimates, and/or velocity estimates for the tracking object and/or the target object. In some approaches, the bounding box can also be based on a measures (or estimates) of uncertainty with respect to location, pose, and/or size of the tracking object and/or the target object. As such, the image area of the bounding box may be sized (increased or decreased) to account for these uncertainty measures. By way of example, the image area covered by the bounding box may be configured based on a statistical likelihood that the bounding box—given the known uncertainty measures—encompasses the target object.

In some examples, the process 1100 can include, at step 1108, extracting a sub-image from the image, wherein the sub-image comprises an area of the image within the bounding box. In some approaches, the sub-image can be pre-processed, for example, to adjust (scale) the sub-image to a predetermined height and/or width (size) in preparation for ingestion by a detection model.

In some examples, the process 1100 can include, at step 1110, detecting, using an object detection model, a location of the object within the sub-image. In some aspects, the object detection model can be (or may include) a machine-learning classifier that is configured to identify one or more vehicles within the sub-image.

Additionally, in some aspects, the process 1100 can include steps for tracking the detected object, e.g., through one or more subsequent images or frames. By way of example, the tracking object can receive a second set of messages (e.g., V2X messages, DSRC messages, etc.) associated with the target object, and track, using an object tracker, a changing location of the target object in the image based on the second set of messages. Depending on the desired implementation, different types of object trackers may be used. For example, the object tracker can be (or may include) a Kalman filter, an extended Kaman filter, a particle filter, or a combination thereof. In some implementations, the object tracker is initialized using the first set of messages, the detected location of the object in the sub-image, or a combination thereof.

In some examples, the processes described herein (e.g., process 1100 and/or other process described herein) may be performed by a computing device or apparatus (e.g., a vehicle computer system). In one example, the process 1100 can be performed by the vehicle 204 of FIG. 2. In another example, the process 1100 can be performed by a computing device with the computing system 1200 shown in FIG. 12. For instance, a vehicle with the computing architecture shown in FIG. 12 can include the components of the vehicle 204 of FIG. 2 and can implement the operations of FIG. 11.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random-access memory (RAM) 1225 to processor 1210. Computing system 1200 can include a cache 1212 of high-speed memory connected directly with, in close proximity to, or integrated as part of processor 1210.

Processor 1210 can include any general-purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly.

Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include the following:

Aspect 1. An apparatus for performing object detection and tracking, comprising: at least one memory; and at least one processor coupled to the at least one memory, the at least one processor configured to: obtain, at a tracking object, an image comprising a target object; obtain, at the tracking object, a first set of messages associated with the target object; determine a bounding box for the target object in the image based on the first set of messages associated with the target object; extract a sub-image from the image, wherein the sub-image comprises an area of the image within the bounding box; and detect, using an object detection model, a location of the target object within the sub-image.

Aspect 2. The apparatus of claim 1, wherein the at least one processor is further configured to: receive a second set of messages associated with the target object; and track, using an object tracker, a changing location of the target object in the image based on the second set of messages.

Aspect 3. The apparatus of aspect 2, wherein the first set of messages and the second set of messages comprises one or more vehicle-to-everything (V2X) wireless messages, Dedicated Short-Range Communications wireless messages, or a combination thereof.

Aspect 4. The apparatus of any one of aspects 2 or 3, wherein the object tracker is a Kalman filter, an extended Kaman filter, a particle filter, or a combination thereof.

Aspect 5. The apparatus of any one of aspects 2 to 4, wherein the object tracker is initialized using the first set of messages, the detected location of the object in the sub-image, or a combination thereof.

Aspect 6. The apparatus of any one of aspects 2 to 5, wherein the at least one processor is further configured to: obtain, at the tracking object, a new image comprising the target object; obtain, at the tracking object, a second set of messages associated with the target object; and determine a new bounding box for the target object in the new image using the object tracker.

Aspect 7. The apparatus of aspect 6, wherein the at least one processor is further configured to: extract a new sub-image from the new image, wherein the new sub-image comprises an area of the new image within the new bounding box; and detect, using the object detection model, a new location of the target object within the new sub-image.

Aspect 8. The apparatus of any one of aspects 1 to 7, wherein the object detection model comprises a machine-learning classifier that is configured to identify one or more vehicles within the sub-image.

Aspect 9. The apparatus of any one of aspects 1 to 8, wherein, to determine the bounding box for the target object in the image, the at least one processor is configured to: determine a size estimate for the target object based on the first set of messages associated with the target object; and determine a pose estimate for the target object based on the first set of messages associated with the target object, wherein the bounding box is based on the size estimate for the target object, the pose estimate for the target object, or a combination thereof.

Aspect 10. The apparatus of aspect 9, wherein, to determine the bounding box for the target object, the at least one processor is further configured to: determine a pose estimate for the tracking object, and wherein the bounding box is further based on the pose estimate for the tracking object.

Aspect 11. The apparatus of aspect 10, wherein a size of the bounding box is based on an uncertainty measure associated with the pose estimate of the target object, an uncertainty measure associated with the pose estimate of the tracking object, or a combination thereof.

Aspect 12. The apparatus of any one of aspects 1 to 11, wherein, to extract the sub-image from the image, the at least one processor is further configured to: scale the sub-image to a pre-determined size.

Aspect 13. A method for performing object detection and tracking, the method comprising: obtaining, at a tracking object, an image comprising a target object; obtaining, at the tracking object, a first set of messages associated with the target object; determining a bounding box for the target object in the image based on the first set of messages associated with the target object; extracting a sub-image from the image, wherein the sub-image comprises an area of the image within the bounding box; and detecting, using an object detection model, a location of the target object within the sub-image.

Aspect 14. The method of aspect 13, further comprising: receiving a second set of messages associated with the target object; and tracking, using an object tracker, a changing location of the target object in the image based on the second set of messages.

Aspect 15. The method of aspect 14, wherein the first set of messages and the second set of messages comprises one or more vehicle-to-everything (V2X) wireless messages, Dedicated Short-Range Communications (DSRC) wireless messages, or a combination thereof.

Aspect 16. The method of any one of aspects 14 or 15, wherein the object tracker is based on a Kalman filter, an extended Kalman filter, a particle filter, or a combination thereof.

Aspect 17. The method of any one of aspects 14 to 16, wherein the object tracker is initialized using the first set of messages, the detected location of the object in the sub-image, or a combination thereof.

Aspect 18. The method of any one of aspects 14 to 17, further comprising: obtaining, at the tracking object, a new image comprising the target object; obtaining, at the tracking object, a second set of messages associated with the target object; and determining a new bounding box for the target object in the new image using the object tracker.

Aspect 19. The method of aspect 18, further comprising: extracting a new sub-image from the new image, wherein the new sub-image comprises an area of the new image within the new bounding box; and detecting, using the object detection model, a new location of the target object within the new sub-image.

Aspect 20. The method of any one of aspects 13 to 19, wherein the object detection model comprises a machine-learning classifier that is configured to identify one or more vehicles within the sub-image.

Aspect 21. The method of any one of aspects 13 to 20, wherein determining the bounding box for the target object in the image, comprises: determining a size estimate for the target object based on the first set of messages associated with the target object; and determining a pose estimate for the target object based on the first set of messages associated with the target object, wherein the bounding box is based on the size estimate for the target object, the pose estimate for the target object, or a combination thereof.

Aspect 22. The method of aspect 21, wherein determining the bounding box for the target object, comprises: determining a pose estimate for the tracking object, and wherein the bounding box is further based on the pose estimate for the tracking object.

Aspect 23. The method of aspect 22, wherein a size of the bounding box is based on an uncertainty measure associated with the pose estimate of the target object, an uncertainty measure associated with the pose estimate of the tracking object, or a combination thereof.

Aspect 24. The method of any one of aspects 13 to 23, wherein extracting the sub-image from the image, comprises: scaling the sub-image to a pre-determined size.

Aspect 25. A non-transitory computer-readable storage medium comprising at least one instruction for causing a computer or processor to: obtain, at a tracking object, an image comprising a target object; obtain, at the tracking object, a first set of messages associated with the target object; determine a bounding box for the target object in the image based on the first set of messages associated with the target object; extract a sub-image from the image, wherein the sub-image comprises an area of the image within the bounding box; and detect, using an object detection model, a location of the target object within the sub-image.

Aspect 26. The non-transitory computer-readable storage medium of aspect 25, further comprising at least one instruction for causing the computer or processor to: receive a second set of messages associated with the target object; and track, using an object tracker, a changing location of the target object in the image based on the second set of messages.

Aspect 27. The non-transitory computer-readable storage medium of aspect 26, wherein the first set of messages and the second set of messages comprises one or more vehicle-to-everything (V2X) wireless messages, Dedicated Short-Range Communications (DSRC) wireless messages, or a combination thereof.

Aspect 28. The non-transitory computer-readable storage medium of any one of aspects 26 or 27, wherein the object tracker is based on a Kalman filter, an extended Kalman filter, a particle filter, or a combination thereof.

Aspect 29. The non-transitory computer-readable storage medium of any one of aspects 26 to 28, wherein the object tracker is initialized using the first set of messages, the detected location of the object in the sub-image, or a combination thereof.

Aspect 30. The non-transitory computer-readable storage medium of any one of aspects 26 to 29, further comprising at least one instruction for causing the computer or processor to: obtain, at the tracking object, a new image comprising the target object; obtain, at the tracking object, a second set of messages associated with the target object; and determine a new bounding box for the target object in the new image using the object tracker.

Aspect 31. The non-transitory computer-readable storage medium of aspect 30, further comprising at least one instruction for causing the computer or processor to: extract a new sub-image from the new image, wherein the new sub-image comprises an area of the new image within the new bounding box; and detect, using the object detection model, a new location of the target object within the new sub-image.

Aspect 32. The non-transitory computer-readable storage medium of any one of aspects 25 to 31, wherein the object detection model comprises a machine-learning classifier that is configured to identify one or more vehicles within the sub-image.

Aspect 33. The non-transitory computer-readable storage medium of any one of aspects 25 to 32, wherein, to determine the bounding box for the target object in the image, the at least one instruction is further configured for causing the computer or processor to: determine a size estimate for the target object based on the first set of messages associated with the target object; and determine a pose estimate for the target object based on the first set of messages associated with the target object, wherein the bounding box is based on the size estimate for the target object, the pose estimate for the target object, or a combination thereof.

Aspect 34. The non-transitory computer-readable storage medium of aspect 33, wherein, to determine the bounding box for the target object, the at least one instruction is further configured for causing the computer or processor to: determine a pose estimate for the tracking object, and wherein the bounding box is further based on the pose estimate for the tracking object.

Aspect 35. The non-transitory computer-readable storage medium of aspect 34, wherein a size of the bounding box is based on an uncertainty measure associated with the pose estimate of the target object, an uncertainty measure associated with the pose estimate of the tracking object, or a combination thereof.

Aspect 36. The non-transitory computer-readable storage medium of any one of aspects 25 to 35, wherein, to extract the sub-image from the image, the at least one instruction is further configured for causing the computer or processor to: scale the sub-image to a pre-determined size.

Aspect 37. An apparatus for performing object detection and tracking, comprising: means for obtaining, at a tracking object, an image comprising a target object; means for obtaining, at the tracking object, a first set of messages associated with the target object; means for determining a bounding box for the target object in the image based on the first set of messages associated with the target object; means for extracting a sub-image from the image, wherein the sub-image comprises an area of the image within the bounding box; and means for detecting, using an object detection model, a location of the target object within the sub-image.

Aspect 38. The apparatus of aspect 37, further comprising: means for receiving a second set of messages associated with the target object; and means for tracking, using an object tracker, a changing location of the target object in the image based on the second set of messages.

Aspect 39. The apparatus of aspect 38, wherein the first set of messages and the second set of messages comprises one or more vehicle-to-everything (V2X) wireless messages, Dedicated Short-Range Communications (DSRC) wireless messages, or a combination thereof.

Aspect 40. The apparatus of any one of aspects 38 or 39, wherein the object tracker is based on a Kalman filter, an extended Kalman filter, a particle filter, or a combination thereof.

Aspect 41. The apparatus of any one of aspects 38 to 40, wherein the object tracker is initialized using the first set of messages, the detected location of the object in the sub-image, or a combination thereof.

Aspect 42. The apparatus of any one of aspects 38 to 41, further comprising: means for obtaining, at the tracking object, a new image comprising the target object; means for obtaining, at the tracking object, a second set of messages associated with the target object; and means for determining a new bounding box for the target object in the new image using the object tracker.

Aspect 43. The apparatus of aspect 42, further comprising: means for extracting a new sub-image from the new image, wherein the new sub-image comprises an area of the new image within the new bounding box; and means for detecting, using the object detection model, a new location of the target object within the new sub-image.

Aspect 44. The apparatus of any one of aspects 37 to 43, wherein the object detection model comprises a machine-learning classifier that is configured to identify one or more vehicles within the sub-image.

Aspect 45. The apparatus of any one of aspects 37 to 44, wherein the means for determining the bounding box for the target object in the image, further comprises: means for determining a size estimate for the target object based on the first set of messages associated with the target object; and means for determining a pose estimate for the target object based on the first set of messages associated with the target object, wherein the bounding box is based on the size estimate for the target object, the pose estimate for the target object, or a combination thereof.

Aspect 46. The apparatus of aspect 45, wherein the means for determining the bounding box for the target object, further comprises: means for determining a pose estimate for the tracking object, and wherein the bounding box is further based on the pose estimate for the tracking object.

Aspect 47. The apparatus of aspect 46, wherein a size of the bounding box is based on an uncertainty measure associated with the pose estimate of the target object, an uncertainty measure associated with the pose estimate of the tracking object, or a combination thereof.

Aspect 48. The apparatus of any one of aspects 37 to 47, wherein the means for extracting the sub-image from the image, further comprises: means for scaling the sub-image to a pre-determined size.

What is claimed is:

1. An apparatus for performing object detection and tracking, comprising:
at least one memory; and
at least one processor coupled to the at least one memory, the at least one processor configured to:
obtain, at a tracking object, an image comprising a target object;
obtain, at the tracking object, a first set of messages associated with the target object;
determine a bounding box for the target object in the image based on the first set of messages associated with the target object, wherein the at least one processor is further configured to:
determine a size estimate for the target object based on the first set of messages associated with the target object; and
determine a pose estimate for the target object based on the first set of messages associated with the target object, wherein the bounding box is based on the size estimate for the target object, the pose estimate for the target object, or a combination thereof;
determine the bounding box based on the pose estimate for the tracking object;
extract a sub-image from the image, wherein the sub-image comprises an area of the image within the bounding box; and
detect, using an object detection model, a location of the target object within the sub-image.

2. The apparatus of claim 1, wherein the at least one processor is further configured to:
receive a second set of messages associated with the target object; and
track, using an object tracker, a changing location of the target object in the image based on the second set of messages.

3. The apparatus of claim 2, wherein the first set of messages and the second set of messages comprises one or more vehicle-to-everything (V2X) wireless messages, Dedicated Short-Range Communications wireless messages, or a combination thereof.

4. The apparatus of claim 2, wherein the object tracker is a Kalman filter, an extended Kaman filter, a particle filter, or a combination thereof.

5. The apparatus of any claim 2, wherein the object tracker is initialized using the first set of messages, the detected location of the object in the sub-image, or a combination thereof.

6. The apparatus of claim 2, wherein the at least one processor is further configured to:
obtain, at the tracking object, a new image comprising the target object;
obtain, at the tracking object, a second set of messages associated with the target object; and
determine a new bounding box for the target object in the new image using the object tracker.

7. The apparatus of claim 6, wherein the at least one processor is further configured to:
extract a new sub-image from the new image, wherein the new sub-image comprises an area of the new image within the new bounding box; and
detect, using the object detection model, a new location of the target object within the new sub-image.

8. The apparatus of claim 1, wherein the object detection model comprises a machine-learning classifier that is configured to identify one or more vehicles within the sub-image.

9. The apparatus of claim 1, wherein a size of the bounding box is base on an uncertainty measure associated with the pose estimate of the target object, an uncertainty measure associated with pose estimated of the tracking object, or a combination thereof.

10. The apparatus of claim 1, wherein, to extract the sub-image from the image, the at least one processor is further configured to:
scale the sub-image to a pre-determined size.

11. A method for performing object detection and tracking, the method comprising:
obtaining, at a tracking object, an image comprising a target object;
obtaining, at the tracking object, a first set of messages associated with the target object;
determining a bounding box for the target object in the image based on the first set of messages associated with the target object, comprises:
determining a size estimate for the target object based on the first set of messages associated with the target object; and
determining a pose estimate for the target object based on the first set of messages associated with the target object, wherein the bounding box is based on the size estimate for the target object, the pose estimate for the target object, or a combination thereof;

determining the bounding box based on the pose estimate for the tracking object;

extracting a sub-image from the image, wherein the sub-image comprises an area of the image within the bounding box; and detecting, using an object detection model, a location of the target object within the sub-image.

12. The method of claim 11, further comprising:

receiving a second set of messages associated with the target object; and tracking, using an object tracker, a changing location of the target object in the image based on the second set of messages.

13. The method of claim 12, wherein the first set of messages and the second set of messages comprises one or more vehicle-to-everything (V2X) wireless messages, Dedicated Short-Range Communications (DSRC) wireless messages, or a combination thereof.

14. The method of claim 12, wherein the object tracker is based on a Kalman filter, an extended Kalman filter, a particle filter, or a combination thereof.

15. The method of claim 12, wherein the object tracker is initialized using the first set of messages, the detected location of the object in the sub-image, or a combination thereof.

16. The method of claim 12, further comprising:

obtaining, at the tracking object, a new image comprising the target object;

obtaining, at the tracking object, a second set of messages associated with the target object; and determining a new bounding box for the target object in the new image using the object tracker.

17. The method of claim 16, further comprising:

extracting a new sub-image from the new image, wherein the new sub-image comprises an area of the new image within the new bounding box; and detecting, using the object detection model, a new location of the target object within the new sub-image.

18. The method of claim 11, wherein the object detection model comprises a machine-learning classifier that is configured to identify one or more vehicles within the sub-image.

19. The method of claim 11, wherein a size of the bounding box is based on an uncertainty measure associated with the pose estimate of the target object, an uncertainty measure associated with the pose estimate of the tracking object, or a combination thereof.

20. The method of claim 11, wherein extracting the sub-image from the image, comprises:

scaling the sub-image to a pre-determined size.

21. A non-transitory computer-readable storage medium comprising at least one instruction for causing a computer or processor to:

obtain, at a tracking object, an image comprising a target object;

obtain, at the tracking object, a first set of messages associated with the target object;

determine a bounding box for the target object in the image based on the first set of messages associated with the target object, comprising:

determine a size estimate for the target object based on the first set of messages associated with the target object; and determine a pose estimate for the target object based on the first set of messages associated with the target object, wherein the bounding box is based on the size estimate for the target object, the pose estimate for the target object, or a combination thereof;

determine the bounding box based on the pose estimate for the tracking object;

extract a sub-image from the image, wherein the sub-image comprises an area of the image within the bounding box; and detect, using an object detection model, a location of the target object within the sub-image.

22. The non-transitory computer-readable storage medium of claim 21, further comprising at least one instruction for causing the computer or processor to:

receive a second set of messages associated with the target object; and track, using an object tracker, a changing location of the target object in the image based on the second set of messages.

23. The non-transitory computer-readable storage medium of claim 22, wherein the first set of messages and the second set of messages comprises one or more vehicle-to-everything (V2X) wireless messages, Dedicated Short-Range Communications (DSRC) wireless messages, or a combination thereof.

24. An apparatus for performing object detection and tracking, comprising:

means for obtaining, at a tracking object, an image comprising a target object;

means for obtaining, at the tracking object, a first set of messages associated with the target object;

means for determining a bounding box for the target object in the image based on the first set of messages associated with the target object, further comprising:

means for determining a size estimate for the target object based on the first set of messages associated with the target object; and means for determining a pose estimate for the target object based on the first set of messages associated with the target object, wherein the bounding box is based on the size estimate for the target object, the pose estimate for the target object, or a combination thereof;

means for determining the bounding box based on the pose estimate for the tracking object;

means for extracting a sub-image from the image, wherein the sub-image comprises an area of the image within the bounding box; and means for detecting, using an object detection model, a location of the target object within the sub-image.

25. The apparatus of claim 24, further comprising:

means for receiving a second set of messages associated with the target object; and means for tracking, using an object tracker, a changing location of the target object in the image based on the second set of messages.

26. The apparatus of claim 24, wherein the object detection model comprises a machine-learning classifier that is configured to identify one or more vehicles within the sub-image.

* * * * *